US012657534B2

(12) United States Patent
Wilde et al.

(10) Patent No.: US 12,657,534 B2
(45) Date of Patent: Jun. 16, 2026

(54) ARTIFICIAL INTELLIGENCE-POWERED AGGREGATION OF PROJECT-RELATED COLLATERAL

(71) Applicant: Microsoft Technology Licensing, LLC, Redmond, WA (US)

(72) Inventors: Benjamin Gustav Wilde, Quincy, MA (US); Jenna Hong, Acton, MA (US); Aleksandr Polyakov, Berkeley, CA (US); Paul Anthony Scudieri, Columbus, OH (US); Susanne Duswald, Vancouver (CA); Ryan Michael Lawrence, Redmond, WA (US); Paul Géraud Dominique Baigts, Vancouver (CA); Michael Adam Scarpati, Wellesley, MA (US); Vyankatesh Manohar Kulkarni, Atlanta, GA (US); Jorge Alberto Olivares Garza, Atlanta, GA (US); Jaden Noel West, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 18/309,618

(22) Filed: Apr. 28, 2023

(65) Prior Publication Data

US 2024/0303568 A1 Sep. 12, 2024

Related U.S. Application Data

(60) Provisional application No. 63/489,333, filed on Mar. 9, 2023.

(51) Int. Cl.
*G06F 40/40* (2020.01)
*G06F 3/0483* (2013.01)
(Continued)

(52) U.S. Cl.
CPC ..... *G06Q 10/06315* (2013.01); *G06F 3/0483* (2013.01); *G06F 40/40* (2020.01); *G06Q 10/063118* (2013.01)

(58) Field of Classification Search
None
See application file for complete search history.

(56) References Cited

U.S. PATENT DOCUMENTS

| | | | | | |
|---|---|---|---|---|---|
| 10,394,825 | B2 * | 8/2019 | Bank | ................... | G06F 16/9535 |
| 11,126,949 | B1 * | 9/2021 | Shook | .............. | G06Q 10/06398 |

(Continued)

FOREIGN PATENT DOCUMENTS

| | | | | | |
|---|---|---|---|---|---|
| CA | 2850182 A1 * | 4/2013 | | ........... | G06F 16/972 |
| CN | 119248162 A * | 1/2025 | | ........... | G06F 3/0488 |

OTHER PUBLICATIONS

S. Spangler, J. T. Kreulen and J. Lessler, "MindMap: utilizing multiple taxonomies and visualization to understand a document collection," Proceedings of the 35th Annual Hawaii International Conference on System Sciences, Big Island, HI, USA, 2002, pp. 1170-1179 (Year: 2002).*

(Continued)

*Primary Examiner* — Jerry O'Connor
*Assistant Examiner* — Philip N Warner
(74) *Attorney, Agent, or Firm* — NovoTechIP International PLLC

(57) ABSTRACT

A data processing system implements receiving, from a client device, first textual content inserted into a user interface element of a first user interface on the client device, the first textual content comprising a natural language description of a first project for which a first workspace is to be created, analyzing the first textual content to obtain keywords in the first textual content using an NLP model trained to receive the textual content and to output the keywords, (Continued)

conducting a search for candidate collateral items associated with each of the keywords using a first search engine, causing the client device to present the candidate collateral items on the first user interface, receiving, from the client device, a first user input selecting one or more of the collateral items from among the candidate collateral items, and causing the client device to present a second workspace user interface representing the first workspace.

17 Claims, 23 Drawing Sheets

(51) Int. Cl.
  *G06Q 10/063* (2023.01)
  *G06Q 10/0631* (2023.01)

(56) References Cited

U.S. PATENT DOCUMENTS

| | | | | |
|---|---|---|---|---|
| 2011/0087982 A1* | 4/2011 | McCann | ............... | G06F 3/0486 |
| | | | | 715/788 |
| 2016/0162472 A1* | 6/2016 | Lynch | ................... | G06F 3/0484 |
| | | | | 715/780 |
| 2018/0189734 A1* | 7/2018 | Newhouse | .............. | G06F 16/25 |
| 2020/0257442 A1* | 8/2020 | Strandberg | ............. | B60K 35/22 |
| 2021/0256036 A1* | 8/2021 | Luo | ........................ | G06F 16/285 |
| 2021/0286633 A1* | 9/2021 | Bar-on | ..................... | G06F 9/452 |
| 2022/0198135 A1* | 6/2022 | Peleg | ...................... | G06F 40/30 |
| 2022/0263877 A1 | 8/2022 | Conlin et al. | | |
| 2022/0327492 A1* | 10/2022 | Vontobel | ........ | G06Q 10/063112 |
| 2023/0215061 A1* | 7/2023 | Vijayaraghavan | ... | G06Q 10/103 |
| | | | | 345/440 |
| 2023/0244848 A1* | 8/2023 | Hahn | .................... | G06F 40/106 |
| | | | | 715/273 |
| 2023/0316197 A1* | 10/2023 | Jemiri | .................... | G06N 3/045 |
| | | | | 705/7.36 |
| 2023/0351289 A1* | 11/2023 | Yin | ................ | G06Q 10/063114 |
| 2023/0376515 A1* | 11/2023 | Tanikella | ............. | G06Q 10/101 |

OTHER PUBLICATIONS

Mingfang Wu, M. Fuller and R. Wilkinson, "Question-driven classification of retrieved documents," Proceedings First Australasian User Interface Conference. AUIC 2000 (Cat. No. PR00515), Canberra, ACT, Australia, 2000, pp. 134-140 (Year: 2000).*
"Application as Filed in U.S. Appl. No. 18/184,267", filed Mar. 15, 2023, 32 Pages.
Chan, Irene, "How to Create Meetings Summaries with OpenAI GPT-3", Retrieved from the URL: https://web.archive.org/web/20221219210240/https://tactiq.io/learn/how-to-create-meetings-summaries-with-openai-gpt-3, Dec. 16, 2022, 4 Pages.
International Search Report and Written Opinion received for PCT Application No. PCT/US2024/018282, May 17, 2024, 15 pages.
Yang, et al., "Research on Automatic News Text Summarization Technology Based on GPT2 Model", Proceedings of the 14th IEEE/ACM international conference on utility and cloud computing companion, Oct. 23, 2021, pp. 418-423.
International Preliminary Report on Patentability (Chapter 1) received for European Application No. PCT/US2024/018282, mailed on Sep. 18, 2025, 9 Pages.
Jovanovic, et al., "Generative Artificial Intelligence: Trends and Prospects", IEEE Computer Society, vol. 55, No. 10, Oct. 2022, pp. 107-112.

* cited by examiner

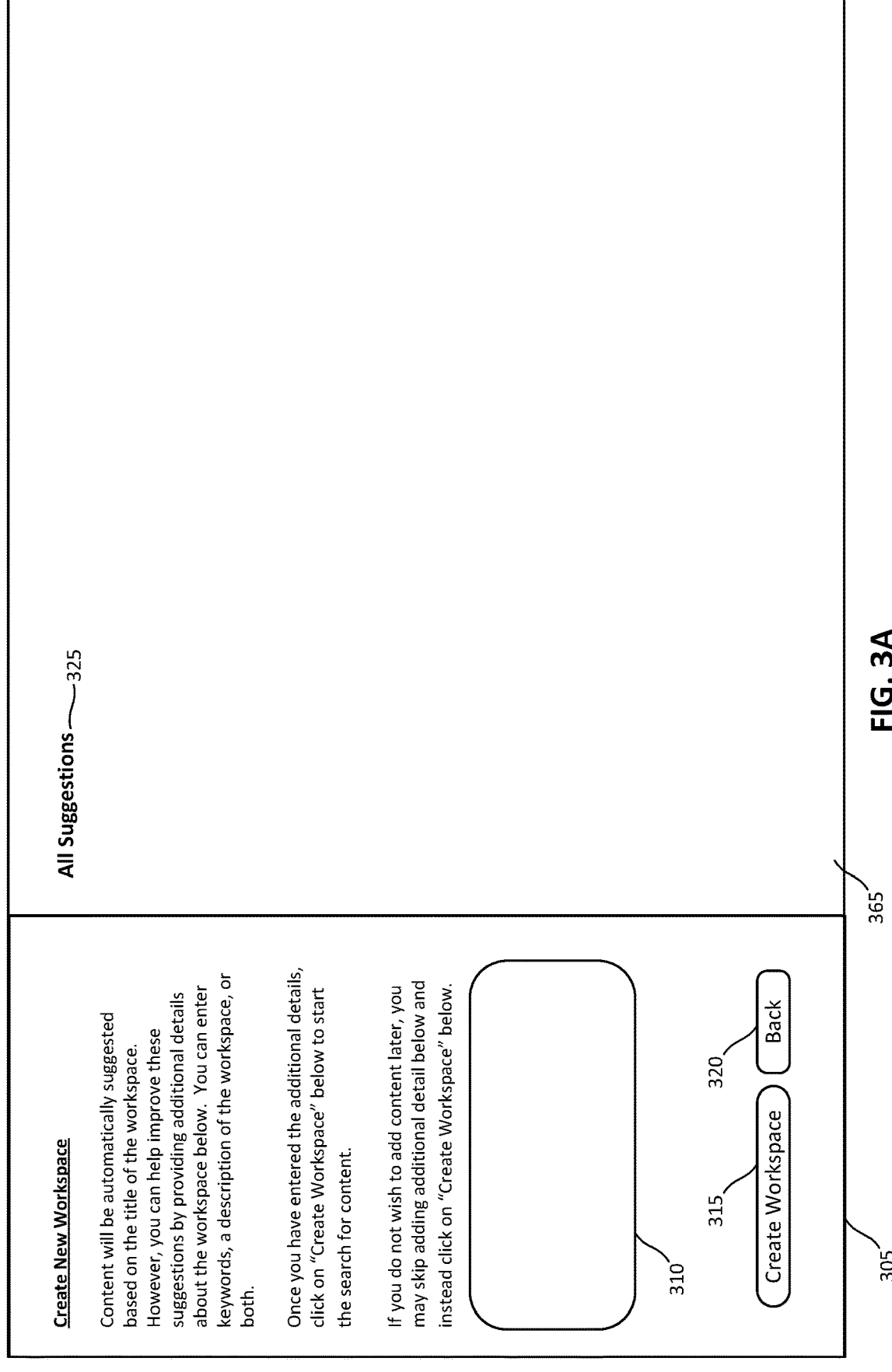

All Suggestions ——325

Create New Workspace

Content will be automatically suggested based on the title of the workspace. However, you can help improve these suggestions by providing additional details about the workspace below. You can enter keywords, a description of the workspace, or both.

Once you have entered the additional details, click on "Create Workspace" below to start the search for content.

If you do not wish to add content later, you may skip adding additional detail below and instead click on "Create Workspace" below.

310

315     320

Create Workspace     Back

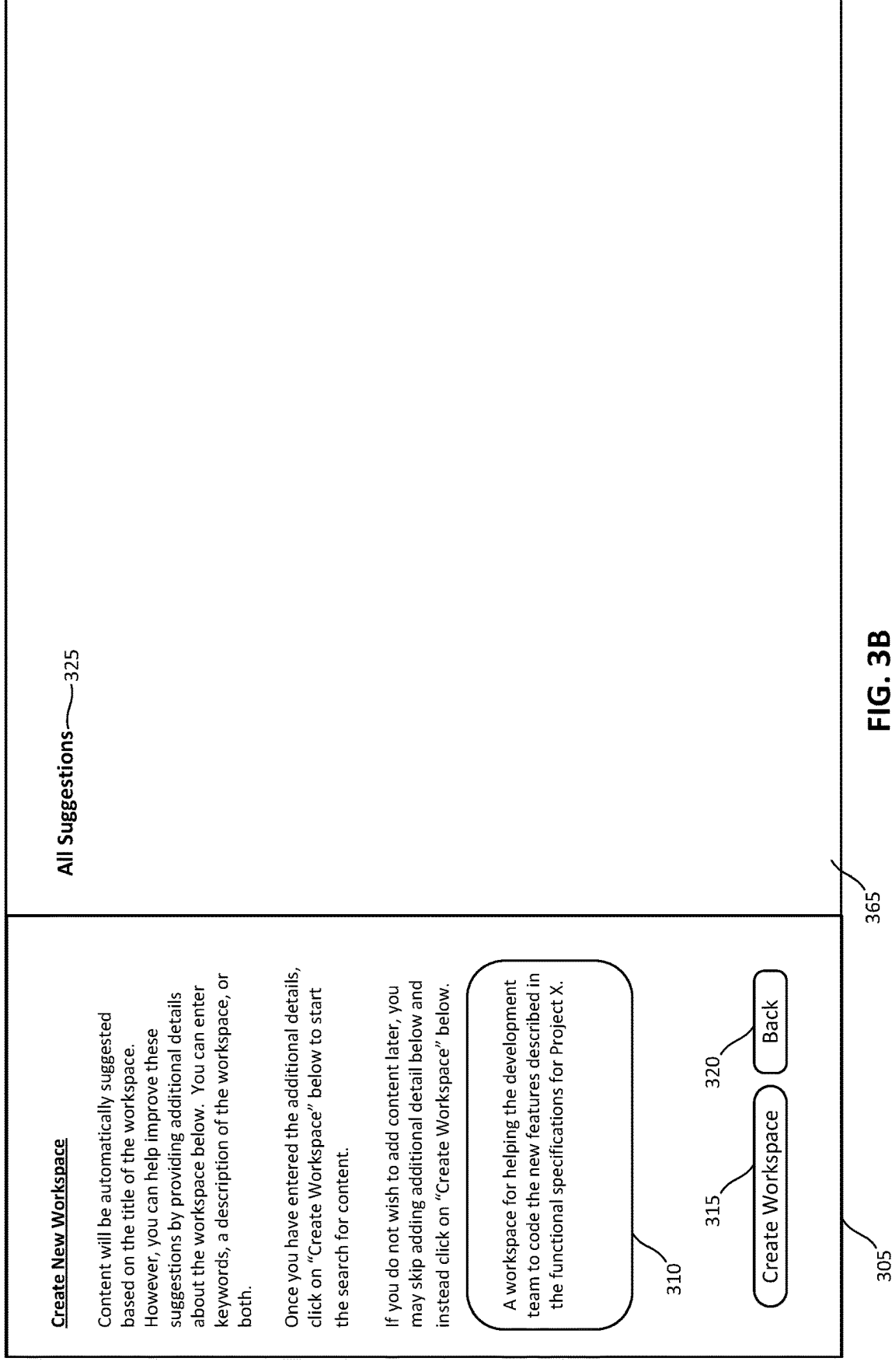

All Suggestions——325

Create New Workspace

Content will be automatically suggested based on the title of the workspace. However, you can help improve these suggestions by providing additional details about the workspace below. You can enter keywords, a description of the workspace, or both.

Once you have entered the additional details, click on "Create Workspace" below to start the search for content.

If you do not wish to add content later, you may skip adding additional detail below and instead click on "Create Workspace" below.

A workspace for helping the development team to code the new features described in the functional specifications for Project X.

315    320

Create Workspace    Back

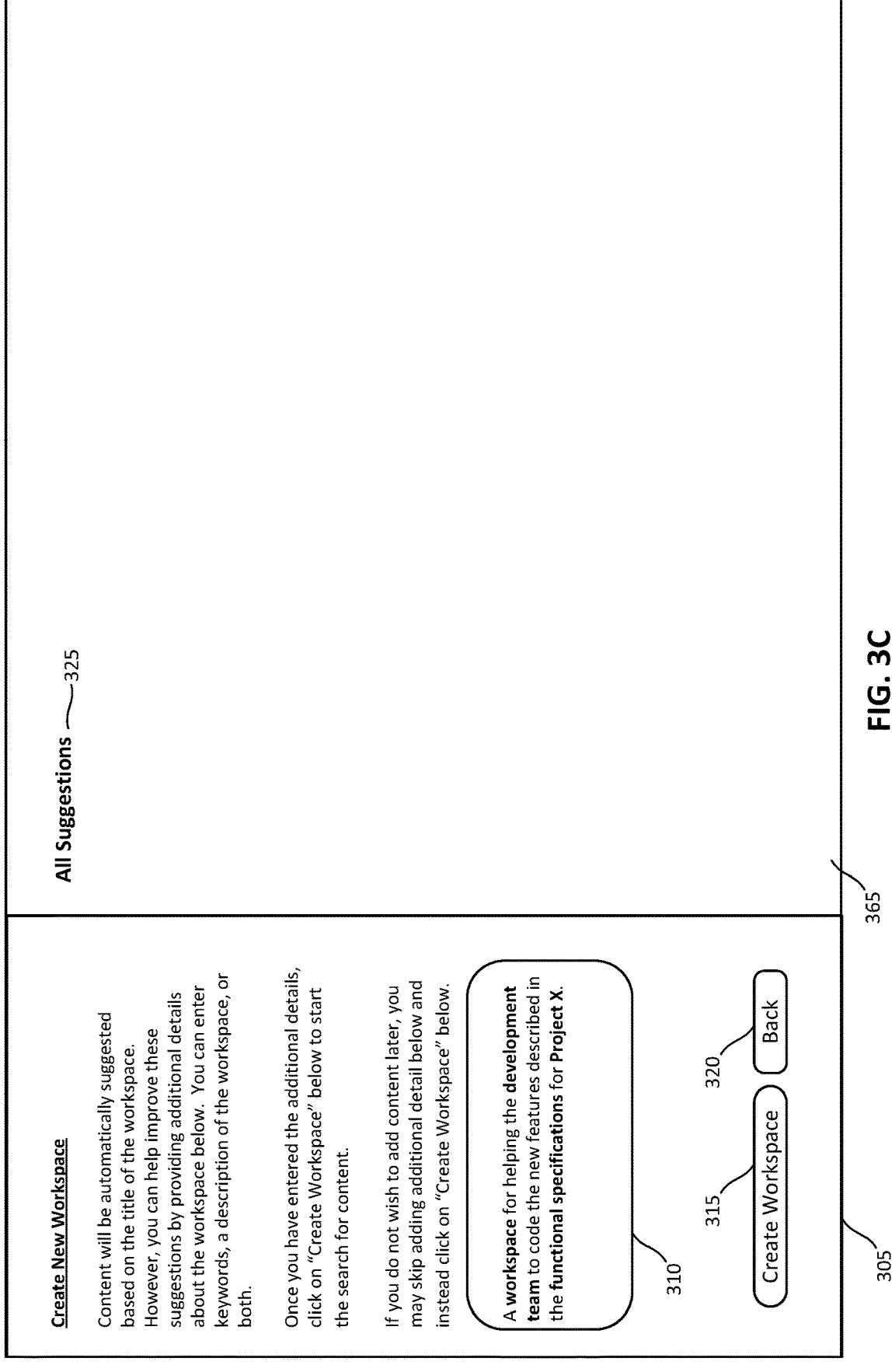

All Suggestions — 325

Create New Workspace

Content will be automatically suggested based on the title of the workspace. However, you can help improve these suggestions by providing additional details about the workspace below. You can enter keywords, a description of the workspace, or both.

Once you have entered the additional details, click on "Create Workspace" below to start the search for content.

If you do not wish to add content later, you may skip adding additional detail below and instead click on "Create Workspace" below.

A workspace for helping the development team to code the new features described in the functional specifications for Project X.

310

315     320

Create Workspace     Back

Figure 3H:
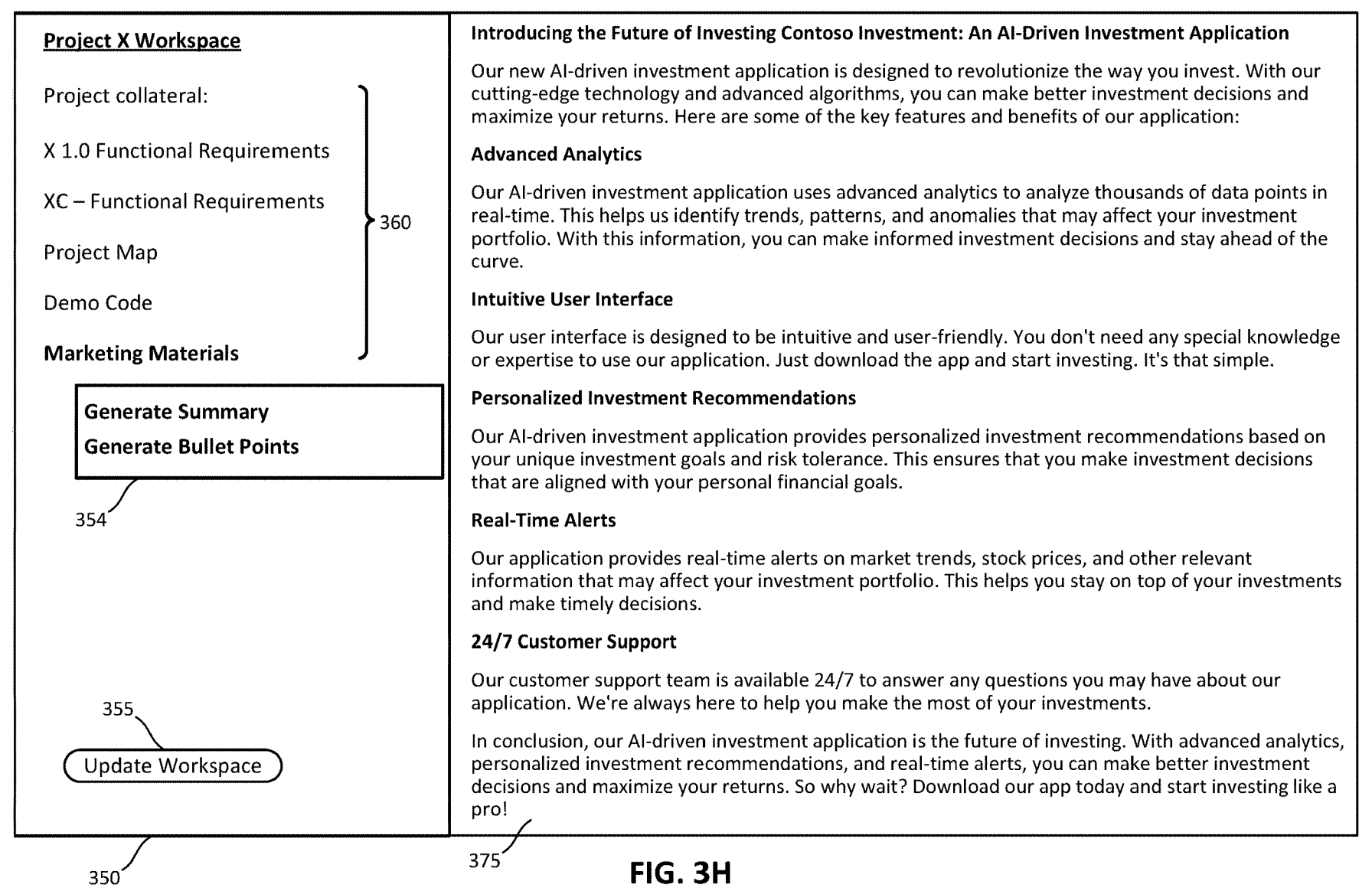

Project X Workspace

Project collateral:

X 1.0 Functional Requirements

XC – Functional Requirements

Project Map

Demo Code

Marketing Materials

Generate Summary
Generate Bullet Points

354

360

Introducing the Future of Investing Contoso Investment: An AI-Driven Investment Application

Our new AI-driven investment application is designed to revolutionize the way you invest. With our cutting-edge technology and advanced algorithms, you can make better investment decisions and maximize your returns. Here are some of the key features and benefits of our application:

Advanced Analytics

Our AI-driven investment application uses advanced analytics to analyze thousands of data points in real-time. This helps us identify trends, patterns, and anomalies that may affect your investment portfolio. With this information, you can make informed investment decisions and stay ahead of the curve.

Intuitive User Interface

Our user interface is designed to be intuitive and user-friendly. You don't need any special knowledge or expertise to use our application. Just download the app and start investing. It's that simple.

Personalized Investment Recommendations

Our AI-driven investment application provides personalized investment recommendations based on your unique investment goals and risk tolerance. This ensures that you make investment decisions that are aligned with your personal financial goals.

Real-Time Alerts

Our application provides real-time alerts on market trends, stock prices, and other relevant information that may affect your investment portfolio. This helps you stay on top of your investments and make timely decisions.

24/7 Customer Support

Our customer support team is available 24/7 to answer any questions you may have about our application. We're always here to help you make the most of your investments.

In conclusion, our AI-driven investment application is the future of investing. With advanced analytics, personalized investment recommendations, and real-time alerts, you can make better investment decisions and maximize your returns. So why wait? Download our app today and start investing like a pro!

375

Update Workspace

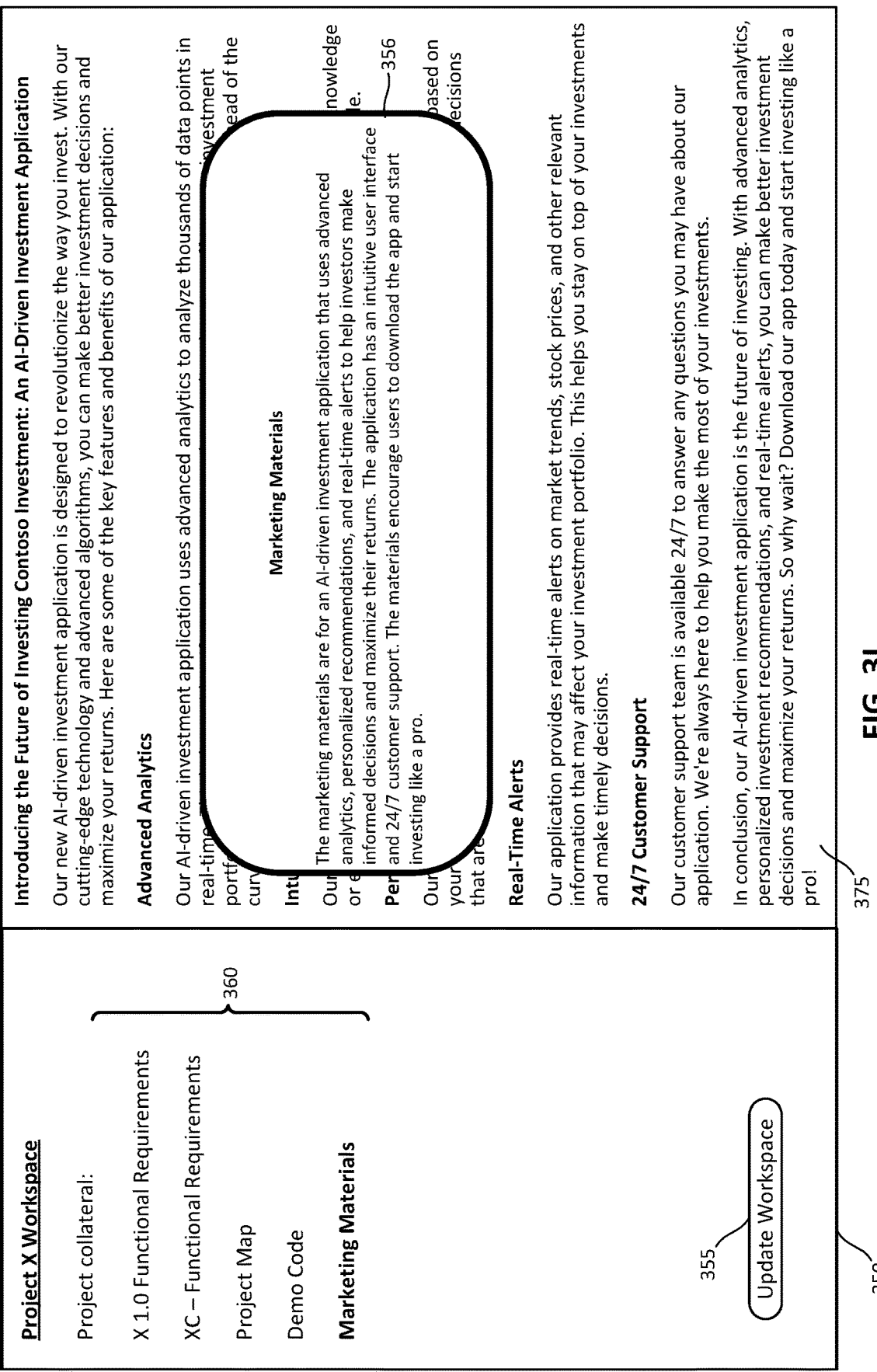

Project X Workspace

Project collateral:

X 1.0 Functional Requirements

XC – Functional Requirements  } 360

Project Map

Demo Code

Marketing Materials

355  ( Update Workspace )

350

---

Introducing the Future of Investing Contoso Investment: An AI-Driven Investment Application

Our new AI-driven investment application is designed to revolutionize the way you invest. With our cutting-edge technology and advanced algorithms, you can make better investment decisions and maximize your returns. Here are some of the key features and benefits of our application:

Advanced Analytics

Our AI-driven investment application uses advanced analytics to analyze thousands of data points in real-time ... portfolio ... curr... ahead of the investment

Marketing Materials

Int...

The marketing materials are are for an AI-driven investment application that uses advanced analytics, personalized recommendations, and real-time alerts to help investors make informed decisions and maximize their returns. The application has an intuitive user interface nowledge e.

Per... and 24/7 customer support. The materials encourage users to download the app and start investing like a pro.

Our... based on your... ecisions that are...   356

Real-Time Alerts

Our application provides real-time alerts on market trends, stock prices, and other relevant information that may affect your investment portfolio. This helps you stay on top of your investments and make timely decisions.

24/7 Customer Support

Our customer support team is available 24/7 to answer any questions you may have about our application. We're always here to help you make the most of your investments.

In conclusion, our AI-driven investment application is the future of investing. With advanced analytics, personalized investment recommendations, and real-time alerts, you can make better investment decisions and maximize your returns. So why wait? Download our app today and start investing like a pro!

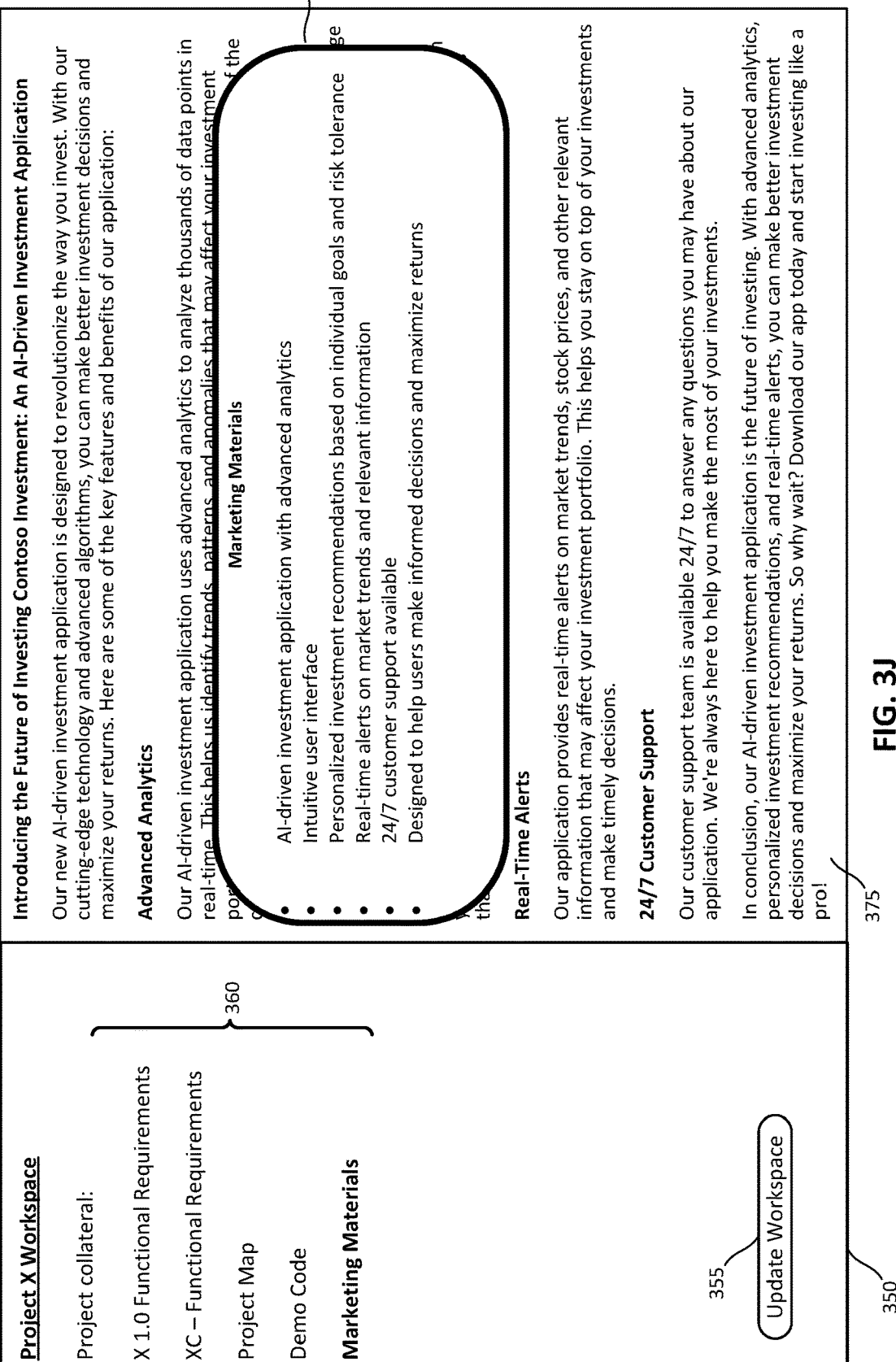

Project X Workspace

Project collateral:

X 1.0 Functional Requirements

XC – Functional Requirements  } 360

Project Map

Demo Code

Marketing Materials

355 — Update Workspace

350

---

Introducing the Future of Investing Contoso Investment: An AI-Driven Investment Application

Our new AI-driven investment application is designed to revolutionize the way you invest. With our cutting-edge technology and advanced algorithms, you can make better investment decisions and maximize your returns. Here are some of the key features and benefits of our application:

Advanced Analytics

Our AI-driven investment application uses advanced analytics to analyze thousands of data points in real-time. This helps us identify trends, patterns, and anomalies that may affect your investment po...

358 — Marketing Materials

- AI-driven investment application with advanced analytics
- Intuitive user interface
- Personalized investment recommendations based on individual goals and risk tolerance
- Real-time alerts on market trends and relevant information
- 24/7 customer support available
- Designed to help users make informed decisions and maximize returns

Real-Time Alerts

Our application provides real-time alerts on market trends, stock prices, and other relevant information that may affect your investment portfolio. This helps you stay on top of your investments and make timely decisions.

24/7 Customer Support

Our customer support team is available 24/7 to answer any questions you may have about our application. We're always here to help you make the most of your investments.

In conclusion, our AI-driven investment application is the future of investing. With advanced analytics, personalized investment recommendations, and real-time alerts, you can make better investment decisions and maximize your returns. So why wait? Download our app today and start investing like a pro!

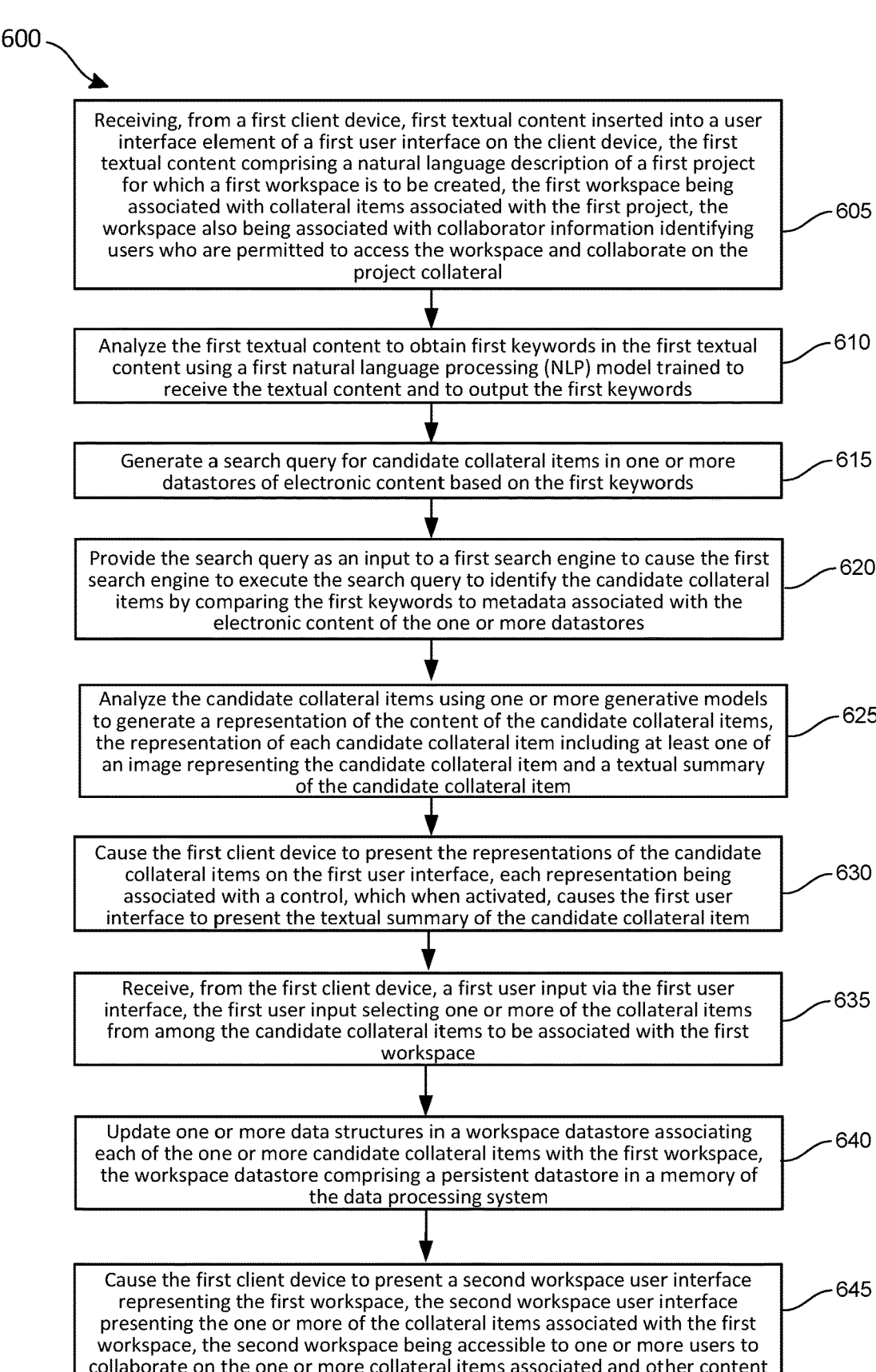

600

Receiving, from a first client device, first textual content inserted into a user interface element of a first user interface on the client device, the first textual content comprising a natural language description of a first project for which a first workspace is to be created, the first workspace being associated with collateral items associated with the first project, the workspace also being associated with collaborator information identifying users who are permitted to access the workspace and collaborate on the project collateral — 605

Analyze the first textual content to obtain first keywords in the first textual content using a first natural language processing (NLP) model trained to receive the textual content and to output the first keywords — 610

Generate a search query for candidate collateral items in one or more datastores of electronic content based on the first keywords — 615

Provide the search query as an input to a first search engine to cause the first search engine to execute the search query to identify the candidate collateral items by comparing the first keywords to metadata associated with the electronic content of the one or more datastores — 620

Analyze the candidate collateral items using one or more generative models to generate a representation of the content of the candidate collateral items, the representation of each candidate collateral item including at least one of an image representing the candidate collateral item and a textual summary of the candidate collateral item — 625

Cause the first client device to present the representations of the candidate collateral items on the first user interface, each representation being associated with a control, which when activated, causes the first user interface to present the textual summary of the candidate collateral item — 630

Receive, from the first client device, a first user input via the first user interface, the first user input selecting one or more of the collateral items from among the candidate collateral items to be associated with the first workspace — 635

Update one or more data structures in a workspace datastore associating each of the one or more candidate collateral items with the first workspace, the workspace datastore comprising a persistent datastore in a memory of the data processing system — 640

Cause the first client device to present a second workspace user interface representing the first workspace, the second workspace user interface presenting the one or more of the collateral items associated with the first workspace, the second workspace being accessible to one or more users to collaborate on the one or more collateral items associated and other content — 645

FIG. 6A

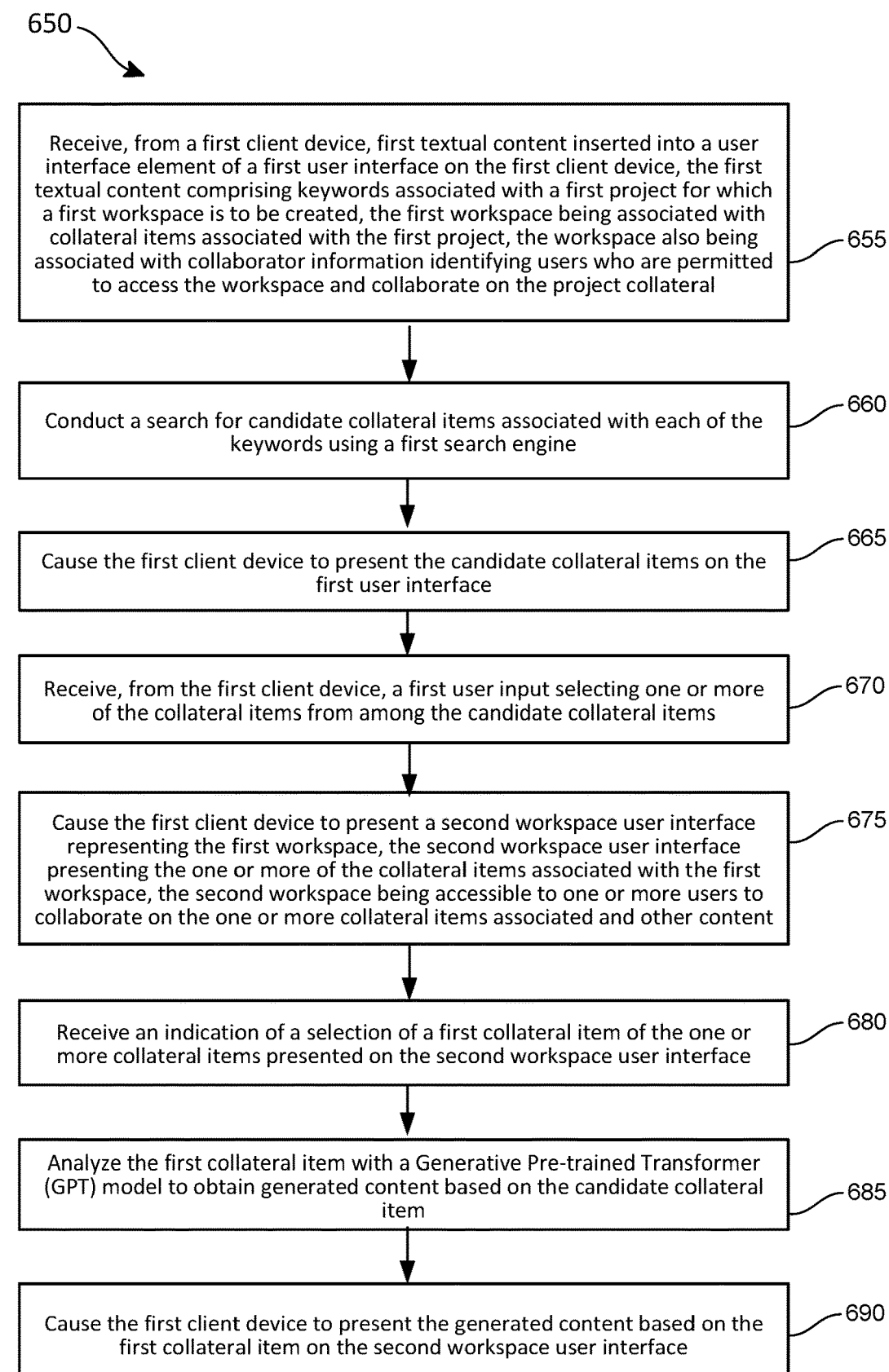

650

Receive, from a first client device, first textual content inserted into a user interface element of a first user interface on the first client device, the first textual content comprising keywords associated with a first project for which a first workspace is to be created, the first workspace being associated with collateral items associated with the first project, the workspace also being associated with collaborator information identifying users who are permitted to access the workspace and collaborate on the project collateral — 655

Conduct a search for candidate collateral items associated with each of the keywords using a first search engine — 660

Cause the first client device to present the candidate collateral items on the first user interface — 665

Receive, from the first client device, a first user input selecting one or more of the collateral items from among the candidate collateral items — 670

Cause the first client device to present a second workspace user interface representing the first workspace, the second workspace user interface presenting the one or more of the collateral items associated with the first workspace, the second workspace being accessible to one or more users to collaborate on the one or more collateral items associated and other content — 675

Receive an indication of a selection of a first collateral item of the one or more collateral items presented on the second workspace user interface — 680

Analyze the first collateral item with a Generative Pre-trained Transformer (GPT) model to obtain generated content based on the candidate collateral item — 685

Cause the first client device to present the generated content based on the first collateral item on the second workspace user interface — 690

| Workspace ID | Workspace Name | Created Date | Created By | Last Modified |
| --- | --- | --- | --- | --- |
| 0001 | Project X | 2023-01-13 11:30 PTD | mrivera | 2023-02-30 11:30 PTD |
| 0002 | Raptor Demo | 2023-02-05 13:42 PTD | annali | 2023-02-05 15:37 PTD |
| 0003 | R & D Sandbox | 2023-02-07 07:22 PTD | bjornh | 2023-02-09 14:02 PTD |

FIG. 9B

| Workspace ID | Collateral ID | Collateral Name | Date Added | Added By | Content Location |
| --- | --- | --- | --- | --- | --- |
| 0001 | 0001 | X 1.0 Functional Requirements | 2023-01-13 11:30 PTD | mrivera | research.contoso.net\projectx\FR1B.docx |
| 0001 | 0002 | XC – Functional Requirements | 2023-01-13 11:30 PTD | mrivera | research.contoso.net\projectx\FR1.docx |
| 0001 | 0003 | Project Map | 2023-01-13 11:30 PTD | mrivera | research.contoso.net\projectx\map.docx |
| 0001 | 0004 | Demo Code | 2023-01-13 11:30 PTD | mrivera | codebase.sandbox.contoso.net\sb1demo |
| 0001 | 0005 | Marketing Materials | 2023-01-13 11:30 PTD | mrivera | amarketing.contoso.net\mm1.docx |

FIG. 9C

| Workspace ID | Collaborator Name | Collaborator ID | Added By | Added Date | Owner |
| --- | --- | --- | --- | --- | --- |
| 0001 | Maria Rivera | rivera@contoso.com | mrivera | 2023-01-13 10:43 PTD | Y |
| 0002 | Anna Li | annali@contoso.com | mrivera | 2023-01-13 11:30 PTD | N |
| 0003 | John Rhoads | jrhoads@contoso.com | mrivera | 2023-01-13 11:30 PTD | N |
| 0004 | Bjorn Henriksson | bjornh@contoso.com | mrivera | 2023-01-13 11:30 PTD | N |

ARTIFICIAL INTELLIGENCE-POWERED AGGREGATION OF PROJECT-RELATED COLLATERAL

BACKGROUND

Collaboration platforms provide tools that enable multiple users to collaborate with one another in a cohesive manner to create, prepare, review, and/or format various types of electronic content. This electronic content, also referred to herein as "project collateral," may include but are not limited to word processing documents, spreadsheets, presentations, images, drawings, videos, web pages, program code, executable applications, and/or documents or components generated by other types of software applications. It is beneficial for the project collaborators to have all of the project collateral in a single view. However, the project collateral is often distributed across multiple applications and/or multiple storage locations. Consequently, locating and adding project collateral to a workspace associated with a project is a manual and time-consuming process. Furthermore, users may inadvertently overlook or be unaware of useful resources. Hence, there is a need for improved systems and methods that provide a technical solution for improving the user experience by automatically identifying project collateral.

SUMMARY

An example data processing system according to the disclosure includes a processor and a machine-readable medium storing executable instructions. The instructions when executed cause the processor to perform operations including receiving, from a first client device over a first network connection, first textual content inserted into a user interface element of a first user interface on the first client device, the first textual content comprising a natural language description of a first project for which a first workspace is to be created, the first workspace being associated with collateral items associated with the first project, the workspace also being associated with collaborator information identifying users who are permitted to access the workspace and collaborate on the project collateral; analyzing the first textual content to obtain first keywords in the first textual content using a first natural language processing (NLP) model trained to receive the textual content and to output the first keywords; generating a search query for candidate collateral items in one or more datastores of electronic content based on the first keywords; providing the search query as an input to a first search engine to cause the first search engine to execute the search query to identify the candidate collateral items by comparing the first keywords to metadata associated with the electronic content of the one or more datastores; analyzing the candidate collateral items using one or more generative models to generate a representation of the content of the candidate collateral items, the representation of each candidate collateral item including at least one of an image representing the candidate collateral item and a textual summary of the candidate collateral item; causing the first client device to present the representations of the candidate collateral items on the first user interface, each representation being associated with a control, which when activated, causes the first user interface to present the textual summary of the candidate collateral item; receiving, from the first client device, a first user input via the first user interface, the first user input selecting one or more of the collateral items from among the candidate collateral items to be associated with the first workspace; updating one or more data structures in a workspace datastore associating each of the one or more candidate collateral items with the first workspace, the workspace datastore comprising a persistent datastore in a memory of the data processing system; and causing the first client device to present a second workspace user interface representing the first workspace, the second workspace user interface presenting representations of the one or more of the collateral items associated with the first workspace, the second workspace being accessible to one or more users to collaborate on the one or more collateral items associated and other content.

An example data processing system according to the disclosure may include a processor and a machine-readable medium storing executable instructions. The instructions when executed cause the processor to perform operations including receiving, from a first client device, first textual content inserted into a user interface element of a first user interface on the first client device, the first textual content comprising keywords associated with a first project for which a first workspace is to be created, the first workspace being associated with collateral items associated with the first project, the workspace also being associated with collaborator information identifying users who are permitted to access the workspace and collaborate on the project collateral; conducting a search for candidate collateral items associated with each of the keywords using a first search engine; causing the first client device to present the candidate collateral items on the first user interface; receiving, from the first client device, a first user input selecting one or more of the collateral items from among the candidate collateral items to associate with the first workspace; causing the first client device to present a second workspace user interface representing the first workspace, the second workspace user interface presenting the one or more collateral items associated with the first workspace, the second workspace being accessible to one or more users to collaborate at least on the one or more collateral items associated with the first workspace; receiving an indication of a selection of a first collateral item of the one or more collateral items presented on the second workspace user interface; analyzing the first candidate collateral item with a Generative Pretrained Transformer (GPT) model to obtain a summary of the candidate collateral item; and causing the first client device to present the generated content based on the first collateral item on the second workspace user interface.

An example method implemented in a data processing system for providing suggestions for improving textual content includes receiving, from a first client device over a first network connection, first textual content inserted into a user interface element of a first user interface on the first client device, the first textual content comprising a natural language description of a first project for which a first workspace is to be created, the first workspace being associated with collateral items associated with the first project, the workspace also being associated with collaborator information identifying users who are permitted to access the workspace and collaborate on the project collateral; analyzing the first textual content to obtain first keywords in the first textual content using a first natural language processing (NLP) model trained to receive the textual content and to output the first keywords; generating a search query for candidate collateral items in one or more datastores of electronic content based on the first keywords; providing the search query as an input to a first search engine to cause the first search engine to execute the search query to identify the candidate collateral items by comparing the first keywords to metadata associated with the electronic content of the one or more datastores; analyzing the candidate collateral items using one or more generative models to generate a representation of the content of the candidate collateral items, the representation of each candidate collateral item including at least one of an image representing the candidate collateral item and a textual summary of the candidate collateral item; causing the first client device to present the representations of the candidate collateral items on the first user interface, each representation being associated with a control, which when activated, causes the first user interface to present the textual summary of the candidate collateral item; receiving, from the first client device, a first user input via the first user interface, the first user input selecting one or more of the collateral items from among the candidate collateral items to be associated with the first workspace; updating one or more data structures in a workspace datastore associating each of the one or more candidate collateral items with the first workspace, the workspace datastore comprising a persistent datastore in a memory of the data processing system; and causing the first client device to present a second workspace user interface representing the first workspace, the second workspace user interface presenting representations of the one or more of the collateral items associated with the first workspace, the second workspace being accessible to one or more users to collaborate on the one or more collateral items associated and other content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1, 2A, 2B, and 3A-3J are diagrams showing example user interfaces of an implementation of a collaboration platform.

FIG. 6A is a flow chart of an example process for identifying projected-related collateral according to the techniques disclosed herein.

FIG. 6B is a flow chart of another example process for identifying projected-related collateral according to the techniques disclosed herein.

FIG. 9A is an example workspace data structure according to the techniques disclosed herein.

FIG. 9B is an example collateral item data structure according to the techniques disclosed herein.

FIG. 9C is an example collaborator data structure according to the techniques disclosed herein.

DETAILED DESCRIPTION

Figure 1:
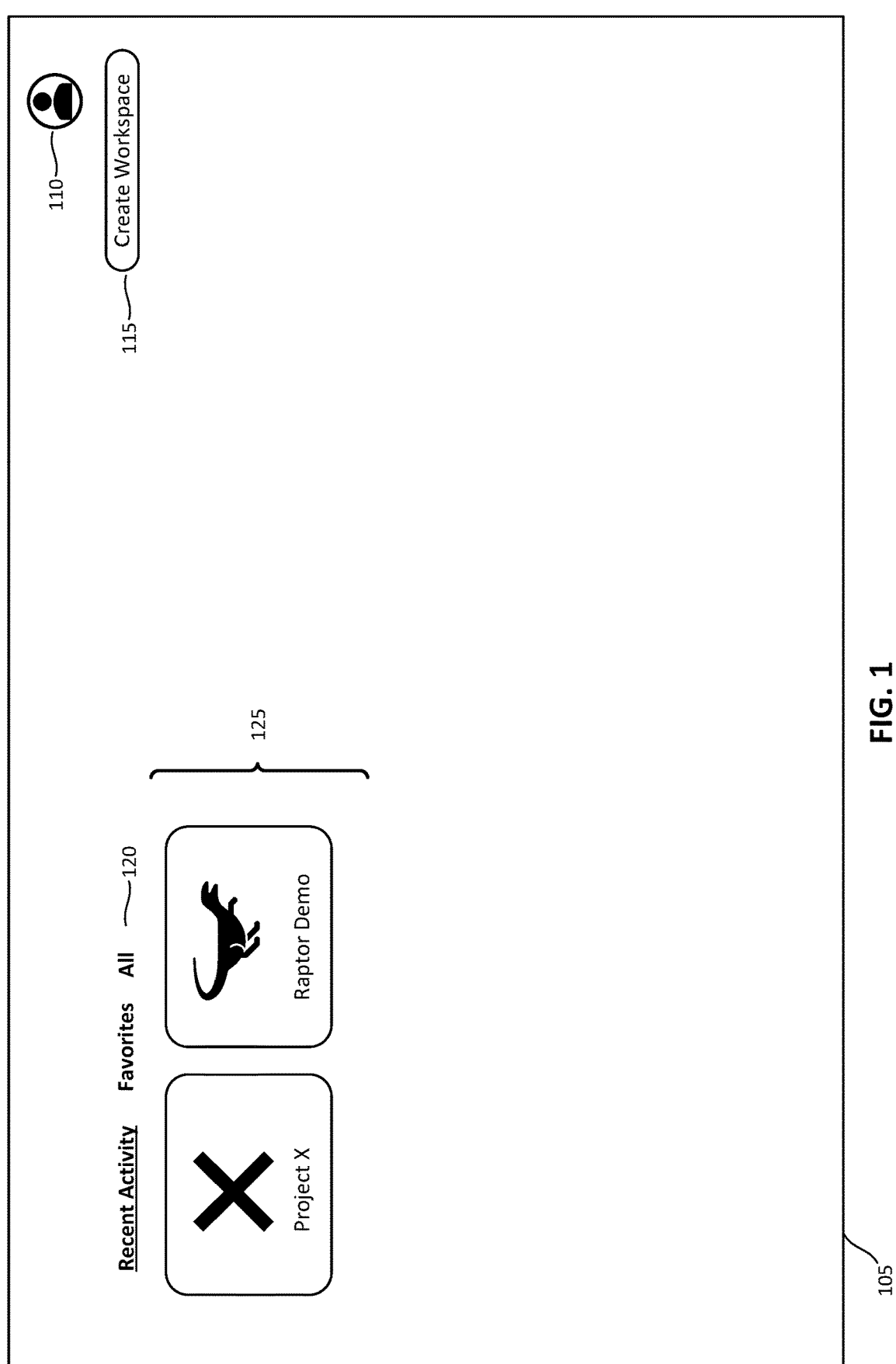

Systems and methods for providing artificial-intelligence (AI) powered aggregation of project-related collateral are described herein. These techniques address the technical problems associated with current collaboration platforms, which require users to manually identify and associate project collateral with the project's workspace. Consequently, the user workflow may be interrupted by manual search for project collateral, and the user may inadvertently overlook or be unaware of relevant content. Users in large enterprises or organizations are often frustrated when they or their team of collaborators discover after they have created content that others within the organization have created similar content that aligns with the user's project. The techniques herein provide means for users to discover such content and avoid duplicating the content that is already available within the enterprise or organization.

The techniques disclosed herein provide an AI-powered aggregation of project-related collateral based on user inputs including, but not limited to one or more of a title associated with the workspace, collaborators who have been invited to participate in the workspace, keywords, and/or a natural language description of the purpose of the workspace. The keywords are identified automatically in the natural language description and/or the title associated with the workspace, in some implementations, by analyzing the natural language description and/or the title using a natural language processing (NLP) model. A technical benefit of this approach is that the model automatically identifies and presents the keywords to the user. This approach allows the user to describe the workspace using language in the way that the user is comfortable with. A technical benefit of this is approach is that the model automatically identifies keywords in the natural language description and/or the title that the user may not have otherwise thought of or identified. These keywords are then used to automatically formulate and execute queries for identifying potentially relevant project-related collateral to be presented to the user and/or potential collaborators whom the user may invite to collaborate on project-related content. A technical benefit of this approach is the strengths of the AI to identify relevant keywords and concepts are leveraged to automatically formulate and execute the search queries without requiring the user to identify specific keywords or concepts and without requiring the user to have the knowledge or ability to format a search query based on these keywords. Consequently, the complexity of the user interfaces presented to the user can be significantly simplified by providing the user with a text field for receiving a natural language description of the workspace and eliminating user interface elements for formulating a search query and for processing the search results. Another technical benefit is that this approach can reduce the computing resources associated with setting up a workspace by reducing the number of queries for project-related collateral by the user when setting up a new workspace, because relevant keywords are automatically extracted from the natural language description and/or the title of the workspace. Another technical benefit of these techniques is that in some implementations a generative model is used to analyze candidate collateral items and to generate a summary of the contents of each candidate collateral item that is presented to the user along with a representation of the candidate collateral items. This approach allows the user to quickly determine whether a particular candidate collateral item is relevant and should be added to the workspace. These and other technical benefits of the techniques disclosed herein will be evident from the discussion of the example implementations that follow.

FIGS. 1, 2A, 2B, and 3A-3J are diagrams showing example user interfaces of an implementation of a collaboration platform. The collaboration platform enables users to collaborate with one another in a cohesive manner to create, prepare, review, and/or format various types of electronic content. The collaboration platform enables the user to organize electronic content into project-specific workspaces. A workspace can be associated with electronic content referred to as project collateral. The workspace may be a private workspace associated with a single user or a collaborative workspace associated with multiple users. Users may be associated with different access levels or roles that permit the user to perform certain actions associated with the workspace and/or the project collateral, such as but not limited to creating new project collateral, adding existing project collateral to the workspace, accessing existing project collateral, inviting users to collaborate on the workspace, and/or disassociating users with the workspace. The user interfaces shown in FIGS. 1, 2A, 2B, and 3A-3J are implemented by a native application on a client device of a user in some implementations and by a web application implemented by the collaboration platform in other implementations. Examples of such a client device and collaboration platform are shown in FIGS. 4 and 5. Some implementations implement the collaboration platform using Microsoft Loop®. Other implementations are implemented using other collaboration platforms.

FIG. 1 is a diagram of an example user interface 105 of an example collaboration platform. The user interface 105 includes workspace representations 125 that each represent a workspace to which the user has access. The user may have created the workspace or may have been invited to collaborate on a project by another user. The user profile icon 110 provides a control, which when clicked on or otherwise activated, causes user information for the user to be presented. The activation of the user profile 110 causes a user profile interface to be presented that provides the user with the ability to configure user profile information, such as but not limited to the first and/or last names of the user, the username of the user in the system, an image or icon used to represent the user on the collaboration platform, user authentication credentials, and/or other such information. The user interface 105 also includes a create workspace option 115, which when activated, causes the user interface 205 shown in FIGS. 2A and 2B to be presented to the user. The selection tabs 120 allow the user to select which workspace representations 125 are presented to the user and/or the order in which the workspace representations 125 are presented. For example, clicking on or otherwise selecting the "Recent Activity" tab causes the collaboration platform to present the workspace representations 125 in an order based on how recently the user has accessed the workspaces. Those workspaces that have been more recently accessed are presented toward the top of the user interface 105 so that the user can quickly identify and return to working with a particular workspace that they recently accessed. Clicking on or otherwise activating the "Favorites" tab causes a set of workspaces specified by the user to be displayed and clicking on or otherwise activating the "All" tab causes all the workspaces to which the user has access to be displayed.

Figure 2A:
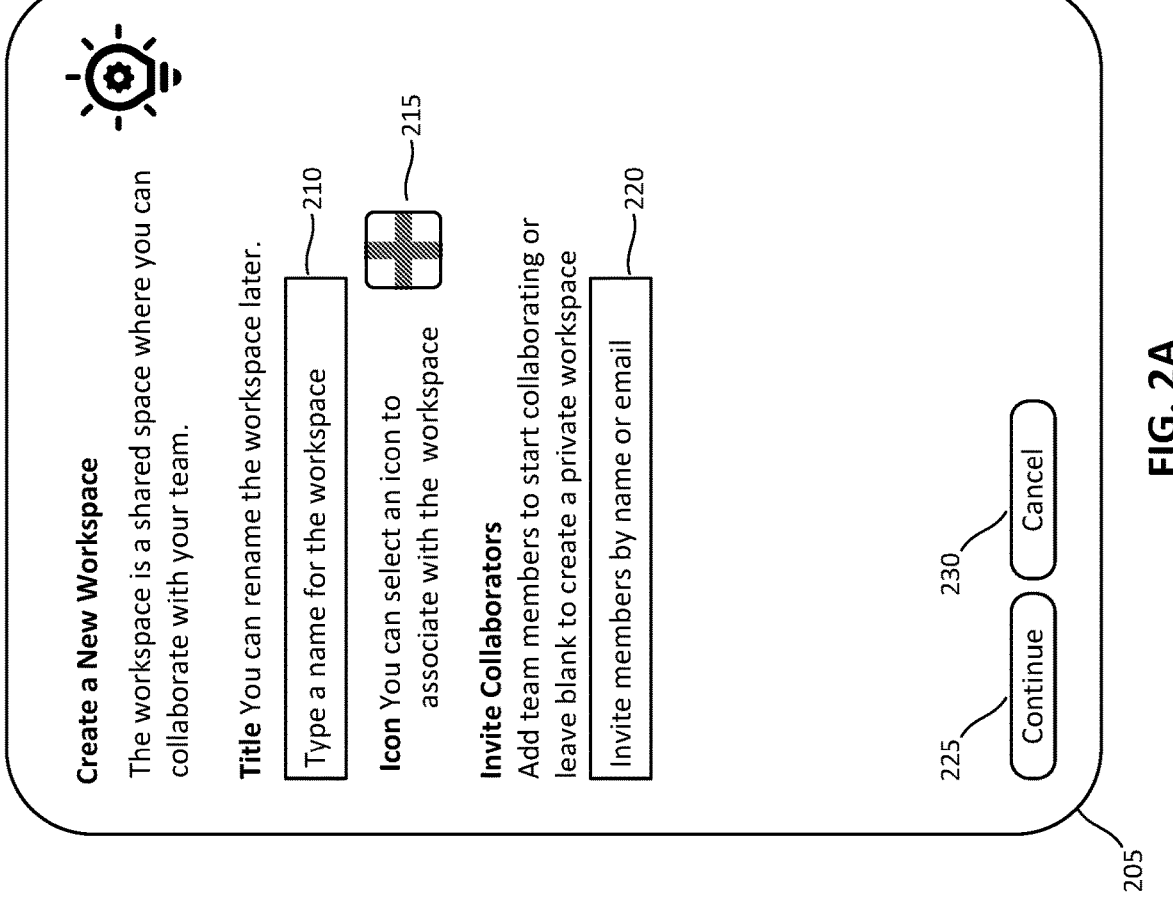

The user interface 205 of FIG. 2A guides the user through the creation of the new workspace. The user interface includes a title field 210 which allows the user to associate a title with the workspace. The title is presented on the workspace representation 125 for the workspace to enable users to quickly identify the workspace from among the workspaces available to the user. The user may also select an icon to be associated with the workspace representation 125 by clicking on or otherwise activating the add icon control 215. Clicking on or otherwise activating the add icon control 215 causes the collaboration platform to present a file selection interface that allows the user to select an image file to use as the icon. In some implementations, clicking on or otherwise activating the add icon control 215 causes the collaboration platform to present an emoji picker that allows the user to select an emoji to be associated with the workspace.

The user interface 205 also includes an invite collaborators field 220. The user can use the invite collaborators field 220 to invite one or more other users to collaborate on the project associated with workspace being created. The user skips this step for private workspaces that have access limited to the user who created the workspace. In some implementations, a private workspace can later be converted to a collaborative workspace or vice versa. For conversions from a collaborative workspace to a private workspace, the users who have been invited to collaborate on the project associated with the workspace will no longer be able to access the now private workspace.

Figure 2B:
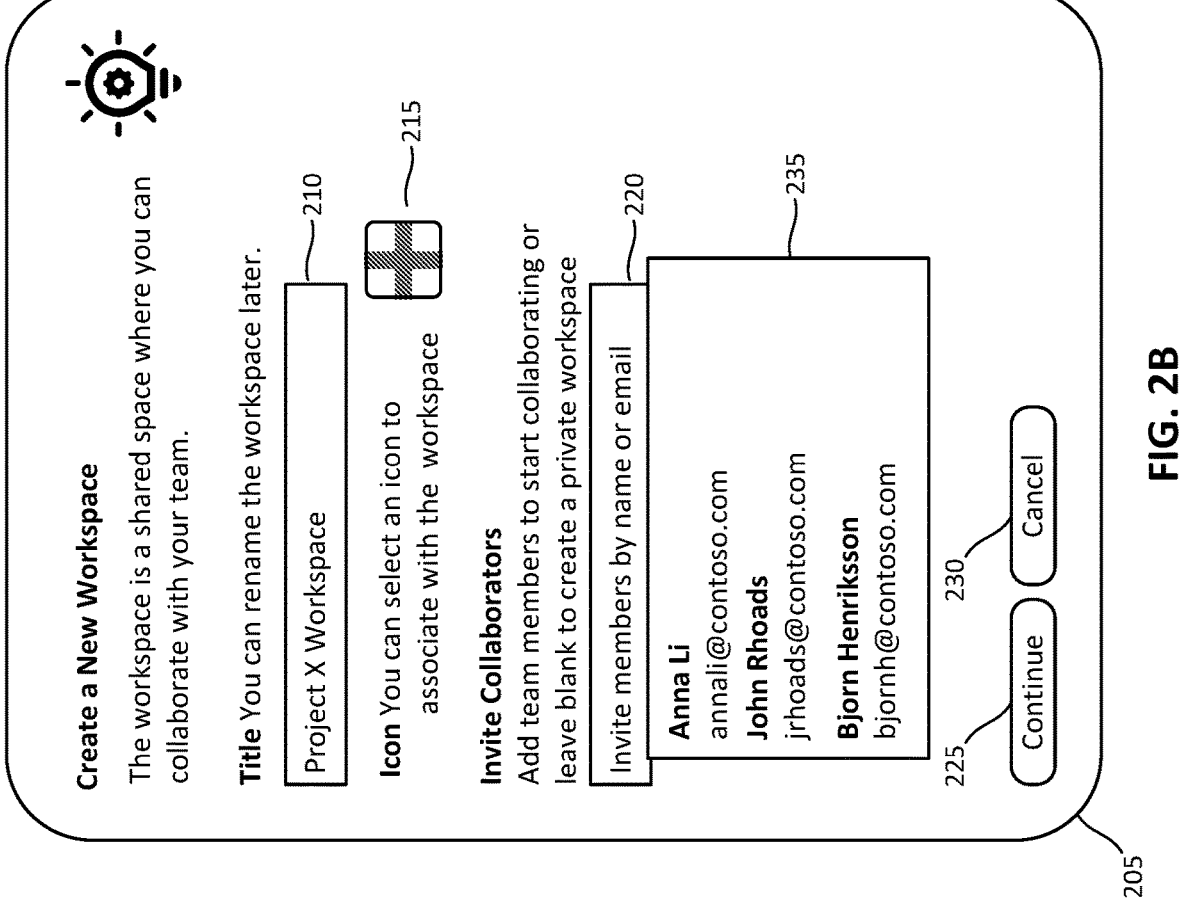

In some implementations, clicking on, typing in, or otherwise activating the invite collaborators field 220 causes the collaborative platform to present a list of potential collaborators 235 as shown in FIG. 2B. The user may click on or otherwise select one or more of these suggestions to be added to be invited to collaborate on the workspace. In some implementations, the list of potential collaborators 235 is populated based on contextual information and/or based on text input by the user. The title associated with the workspace is contextual information considered by the collaboration platform in some implementations. The title associated is analyzed by an NLP model trained to identify keywords in the title that are used to identify potential collaborators that may be relevant based on the keywords. In a non-limiting example, the user creating the workspace is part of an enterprise or other organization that provides a directory of people associated with the organization and related user information, such as calendar information, information indicating the role of these people within the enterprise or organization, and/or other information indicative of the person's relationship with others within the enterprise or organization. In some implementations, the potential collaborators include people with whom the user has recently collaborated on other projects and/or with whom the user has communicated via email, text messages, and/or participated in a meeting via the collaboration platform. In some implementations, the potential collaborators include people who are in the same team or within the same group, division, or other portion of the organization structure as the user. Other implementations may include these or other signal sources for identifying potential collaborators who may be invited to participate in the workspace.

The list of potential collaborators 235 may be ordered by the collaboration platform based on the predicted relevance of the potential collaborators to the user. In a non-limiting example, potential collaborators 235 associated with a particular project team, division, or other role are predicted to be more relevant and are placed at the top of the list of potential collaborators 235. The collaborative platform sends an email and/or other type of message to the user notifying the invited collaborators that they have been invited to collaborate on the workspace. This notification includes instructions and/or controls for the user to accept the invitation.

The user may click on or otherwise activate the continue option 225 or the cancel option 230. Activating the cancel option 230 causes the collaboration platform to close the user interface 205 and return to the user interface 105 and no new workspace is created. Activating the continue option 225 causes the collaboration platform to create a placeholder workspace and associate the invited collaborators (if any) with the placeholder workspace. The collaboration platform also displays the user interface 305 shown in FIGS. 3A-3E in response to the user activating the continue option 225.

The user interface 305 provides the user with an opportunity to search for and associate project-related collateral with the new workspace. The user interface 305 includes a create workspace option 315 and a back option 320. Clicking on or otherwise activating the back option 320 causes the collaboration platform to display the user interface 205. Clicking on or otherwise activating the create workspace option 315 causes the collaboration platform to create the new workspace based on the information provided by the user in the user interfaces 205 and 305. The collaboration platform also sends invitations to invited collaborators in response to creating the new workspace.

Figure 3D:
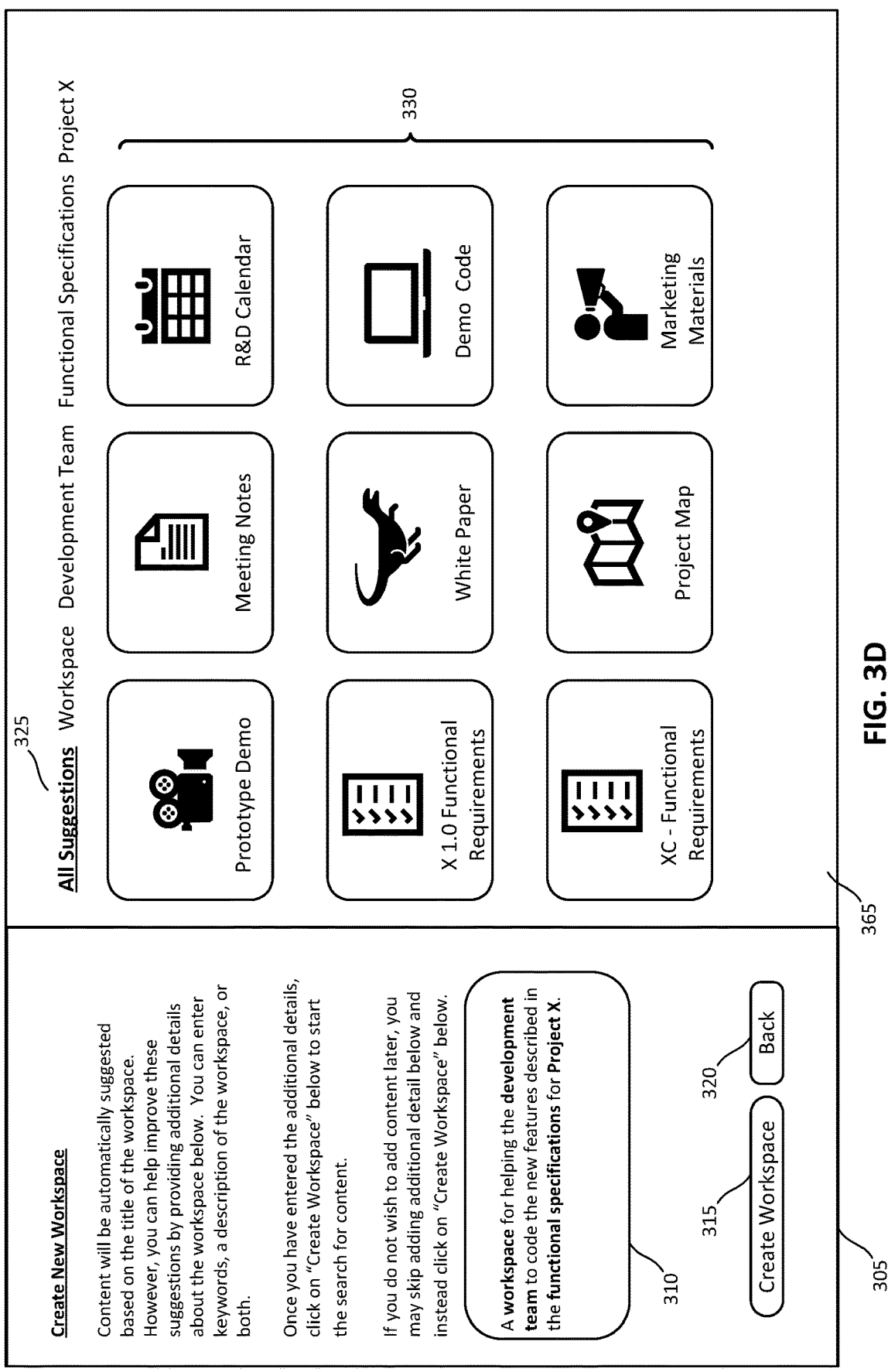

The user interface 305 provides AI-powered search tools for identifying candidate collateral items. The collaboration platform analyzes one or more of a title associated with the workspace, keywords, and/or or a natural language description of the purpose of the workspace to identify the project-related collateral. In the implementation shown in FIGS. 3A-3E, the user interface 305 includes a textual description field 310. The user can type in a natural language description of the purpose of the workspace into the textual description field. An example of such text is shown in FIG. 3B. The collaboration platform analyzes the textual content from the textual description field 310 to identify keywords in the textual content. In some implementations, the collaboration platform analyzes the textual content using an NLP model that is trained to receive a textual input as an input and to identify keywords in the textual content. The NLP model is trained to identify enterprise-specific or organization-specific keywords associated with a particular enterprise or organization in some implementations. The model is implemented by a Generative Pre-trained Transformer (GPT) model, such as but not limited to GPT-3 or GPT-4, or other such generative model. In some alternate implementations, the user specifies the keywords themselves, rather than relying on the model to identify the keywords.

Figure 3E:
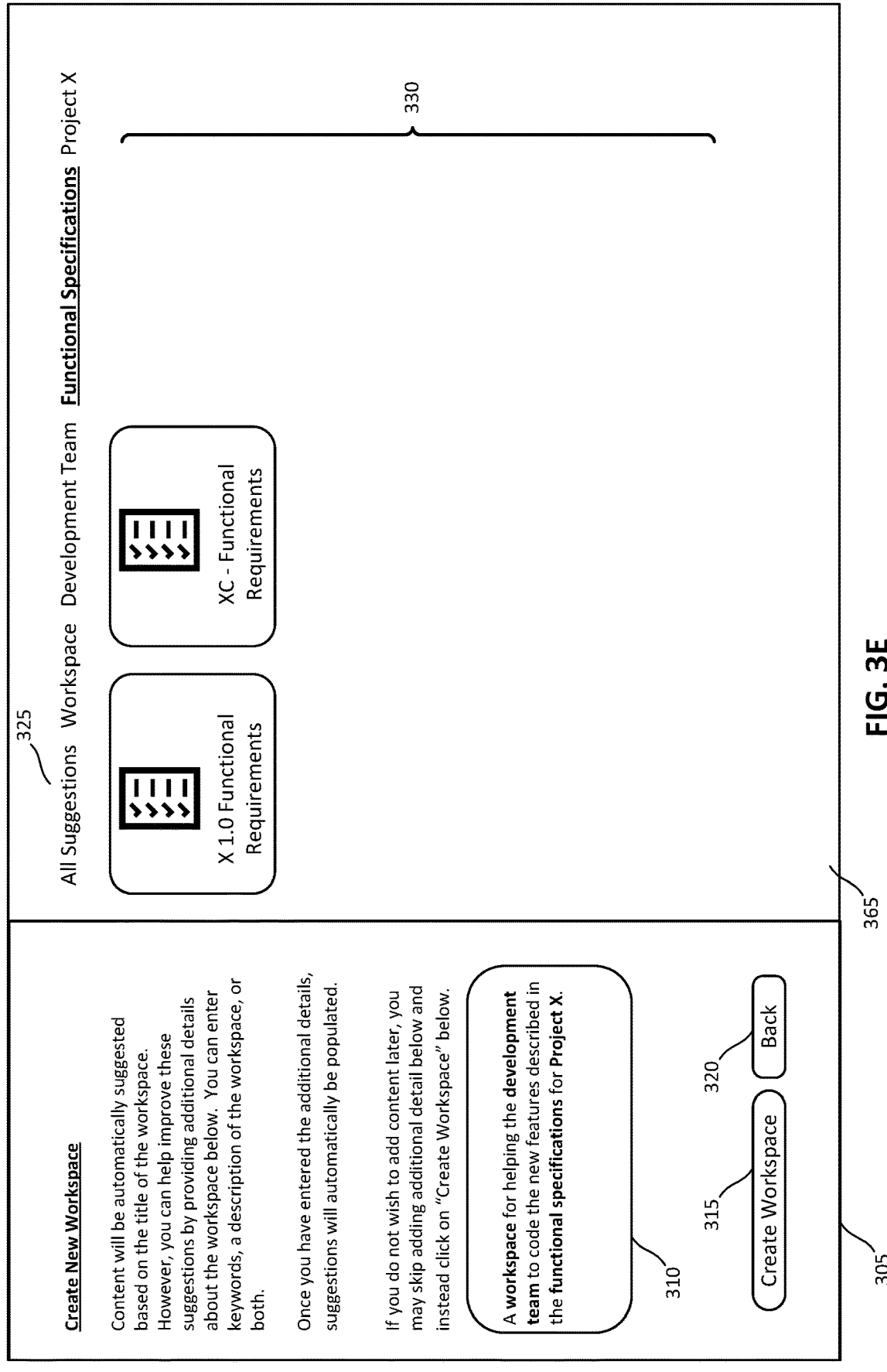

The collaboration platform receives and highlights the keywords as shown in FIG. 3C. The user may then click on or otherwise select a highlighted keyword to cause the collaboration platform to conduct a search for candidate collateral items. The candidate collateral items are presented in the content pane 365. In other implementations, the collaboration platform automatically conducts a search for the candidate collateral items automatically in response to the user adding or modifying textual content of the textual description field 310. The content pane includes selection tabs 325 which allow the user to select which candidate collateral items are presented to the user and/or the order in which the candidate collateral items are presented. In some implementations, a separate tab is created for each of the keywords identified in the textual content added to the textual description field 310. Examples of such tabs being automatically added are shown in FIGS. 3D and 3E. The user can click on or otherwise activate a particular tab to show the candidate collateral items associated with that tab. For example, the "All Suggestions" tab displays all of the candidate collateral items that have been identified for all of the keywords. FIG. 3E show an example in which the user has selected the "Functional Specifications" tab, and the collaboration platform has shown just those candidate collateral items associated with those keywords.

If the user does not provide any textual description in the textual description field 310, the collaboration platform provides candidate project-related collateral suggestions based on the title of the workspace and/or the invited collaborators identified by the user.

The user can select one or more candidate collateral items from among the candidate collateral items 330 to be associated with the workspace. The user may determine that none of the candidate collateral items presented are relevant and instead update the textual content in the textual description field 310 to trigger the collaboration platform to identify the keywords in the updated textual content and query for a new set of candidate collateral items. The user may also elect to not select any candidate collateral items to be included in the workspace, and the workspace can be created without any project-related collateral and the user may add project-related collateral to the workspace at a later time. The user clicks on or otherwise activate the "Create Workspace" option 315 once the user is ready to create the workspace.

Figure 3F:
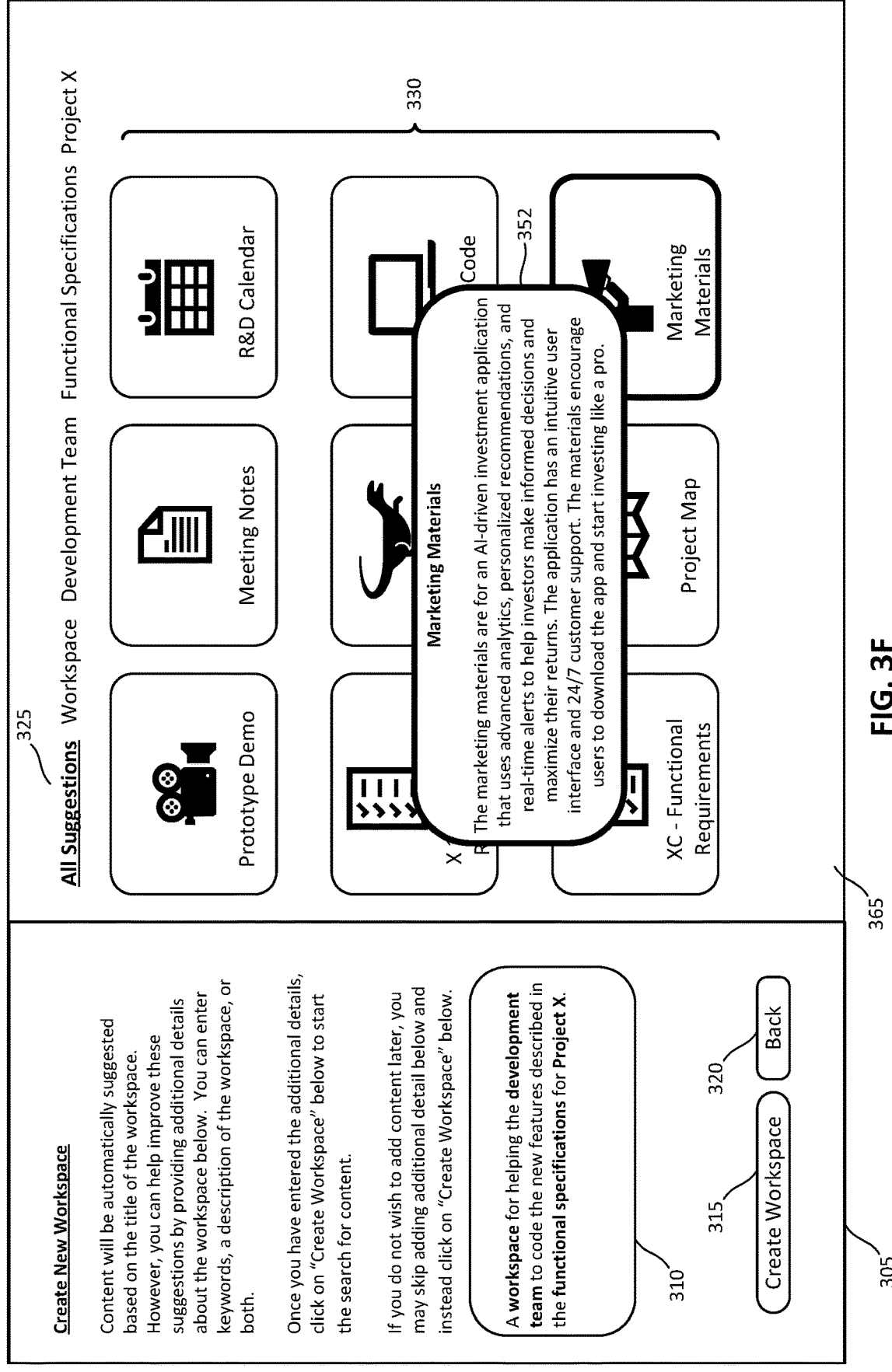

FIG. 3F shows another example of the user interface 350 in which the user can click on otherwise activate a representation of a candidate collateral item to obtain a summary 352 of that collateral item. The summary can help the user determine whether a particular candidate collateral item is relevant and should be associated with the workspace being created. The summary can be created by submitting the textual content of the candidate collateral item to the GPT model for analysis. The format of the summary may vary. In the example shown in FIG. 3F, the summary 352 is in paragraph form, but the summary could be formatted as a bullet point list of features of the candidate collateral item in other implementations. For non-textual collateral items, such as but not limited to imagery or video content, the content collateral item may be processed by a model trained to analyze that particular type of collateral item and to provide a description of the collateral item. In some implementations, the collaboration platform provides an image preview of the candidate collateral item on the user interface 350. In other implementations, the collaboration platform provides the ability for the user to click or scroll through a preview of the candidate collateral item on the user interface 350. In some implementations, the collaboration platform includes information included in metadata associated with the candidate collateral item. The metadata may include various information, such as but not limited to the author or authors of the candidate collateral item, who has recently edited the candidate collateral item, when those edits were performed, and/or other such information.

Figure 3G:
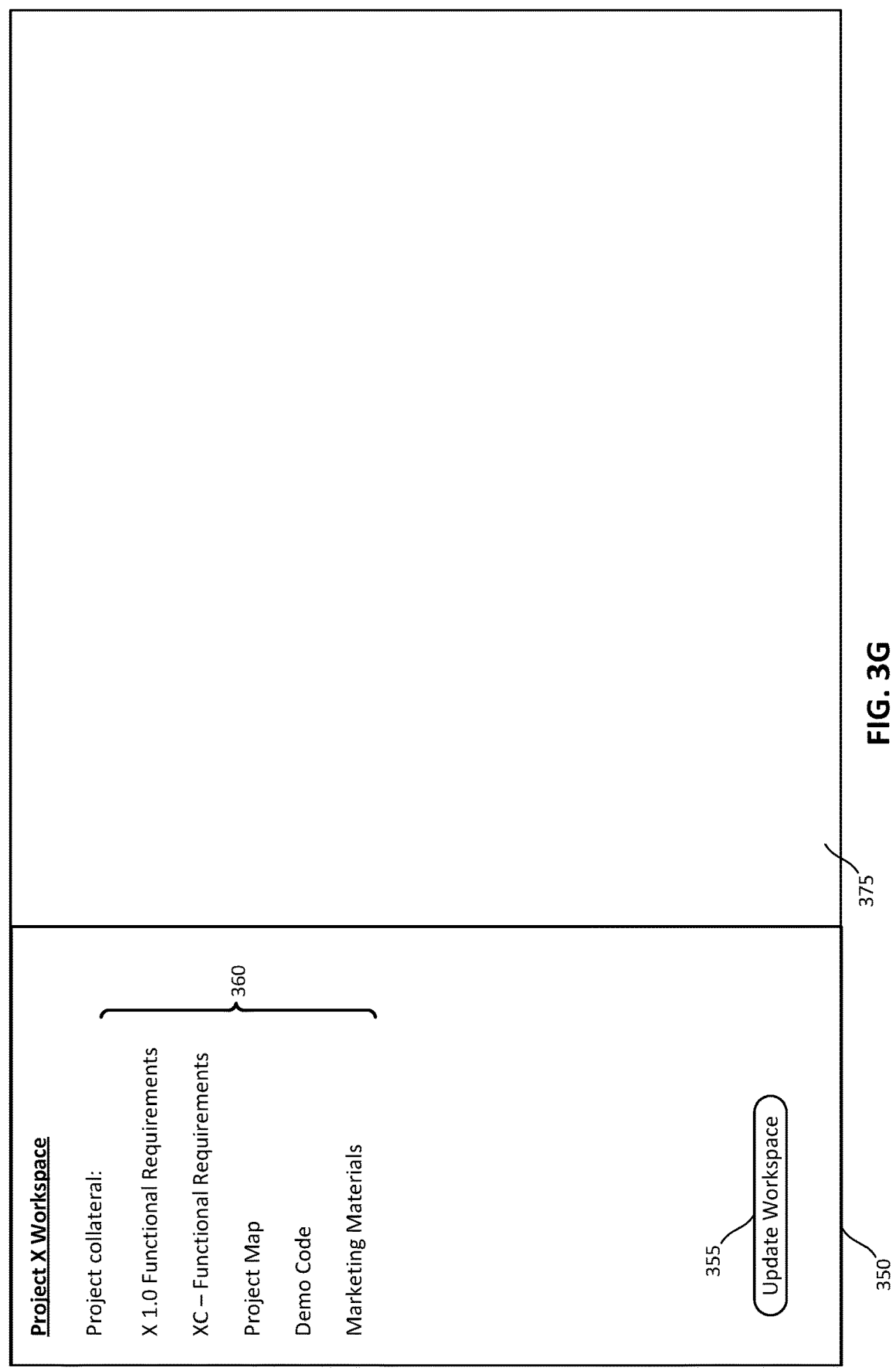

FIG. 3G shows a user interface 350 in which the workspace has been created. The user interface 350 is shown in response to the user clicking on or otherwise activating the "Create Workspace" option 315 or in response to the user selecting a workspace representation of the workspace representations 125 from the user interface 105 shown in FIG. 1. The user interface includes a list of the project collateral 360. The user may click on or otherwise activate a collateral item from the list of the project collateral 360 to cause the collateral item to be presented in the content pane 375. In some implementations, the user interface 350 enables the user to view and/or modify the content items. Some types of content may not be directly viewable and/or editable from the user interface 350, and the collateral platform can cause an application capable of viewing and/or editing the collateral item to be launched on the client device of the user to permit the user to view and/or edit the collateral item.

The collaboration platform also updates a workspace datastore in some implementations in response to the user clicking on or otherwise activating the "Create Workspace" option 315. FIGS. 9A-9C show example data structures that are included in the workspace datastore in some implementations. FIG. 9A shows an example workspace data structure associated with the workspace shown in FIG. 3G. The workspace data structure in this example includes a workspace identifier, the name or title assigned to the workspace, a create date field that indicates when the workspace was created, a created by field that indicates which user created the workspace, and last modified field that indicates when the workspace was last updated. FIG. 9B shows in an example collateral item data structure that is used to store collateral item information associated with the workspace in some implementations. The collateral item data structure includes a workspace identifier field, a collateral item identifier field, a collateral name field, a date added field, an added by field, and a content location field. The workspace identifier field stores the unique identifier of the workspace with which the collateral item has been associated. The collateral identifier field stores a unique identifier of the collateral item. The collateral name field stores a name of the collateral item that is presented on the representation of the collateral items presented on the various user interfaces of the collaboration platform including the user interface 350. The date added field shows when the collaboration item was associated with the workspace. The content location filed stores a Uniform Resource locator, network address and/or filename, or other information indicating where the collateral items is stored. The collaboration platform can use this content location information to access a collateral item in response to a user requesting that the collaboration display, summarize, or perform some other action on the collateral item. FIG. 9C shows an example of a collaborator data structure is used to store collaborator information for the creator of the workspace and the other users invited to collaborate on the workspace. The example implementations of the data structures shown in FIGS. 9A-9C show one possible implementation of the data structure that may be used by the collaboration platform. Other implementations may include different implementations of the data structures that include information instead of or in addition to the information shown in these examples.

The user interface 350 includes in an "Update Workspace" option 355. The "Update Workspace" option 355 allows the user to update the list of collaborators invited to access the workspace and/or search for additional collateral items to be associated with the workspace. Other implementations may include another interface and/or interface elements for updating the collateral items and/or the collaborators who have been invited to collaborate in the workspace.

The user interface 350 provides controls that enable the user to obtain a summary and/or a bullet point list of highlights of the items in the list of project collateral 360. The user can click on or otherwise activate one of the items to cause the collaboration platform to present a list of options available to the user. FIG. 3H shows an example menu 354 that provides the user with two options for receiving information about a collateral item. The first option is a summary of the content of the collateral item. An example summary 356 is shown in FIG. 3I. The second option is a bullet point list providing highlights of major features of the collateral item. An example bullet point list 358 is shown in FIG. 3J. The summary and the bullet point list are generated by a GPT model trained to summarize content in various formats. The collaborative platform provides the textual content of the content item and a prompt for the desired format of the summary to be generated to the GPT model as an input. The summaries can help the user who created the workspace and/or the collaborators quickly understand what a particular collateral item is. This can be particularly useful for collateral items that have been added to the workspace by other users. In other implementations, the GPT model can be used to generate other types of content from collateral items in addition to or instead of the summaries described here.

Figure 4A:
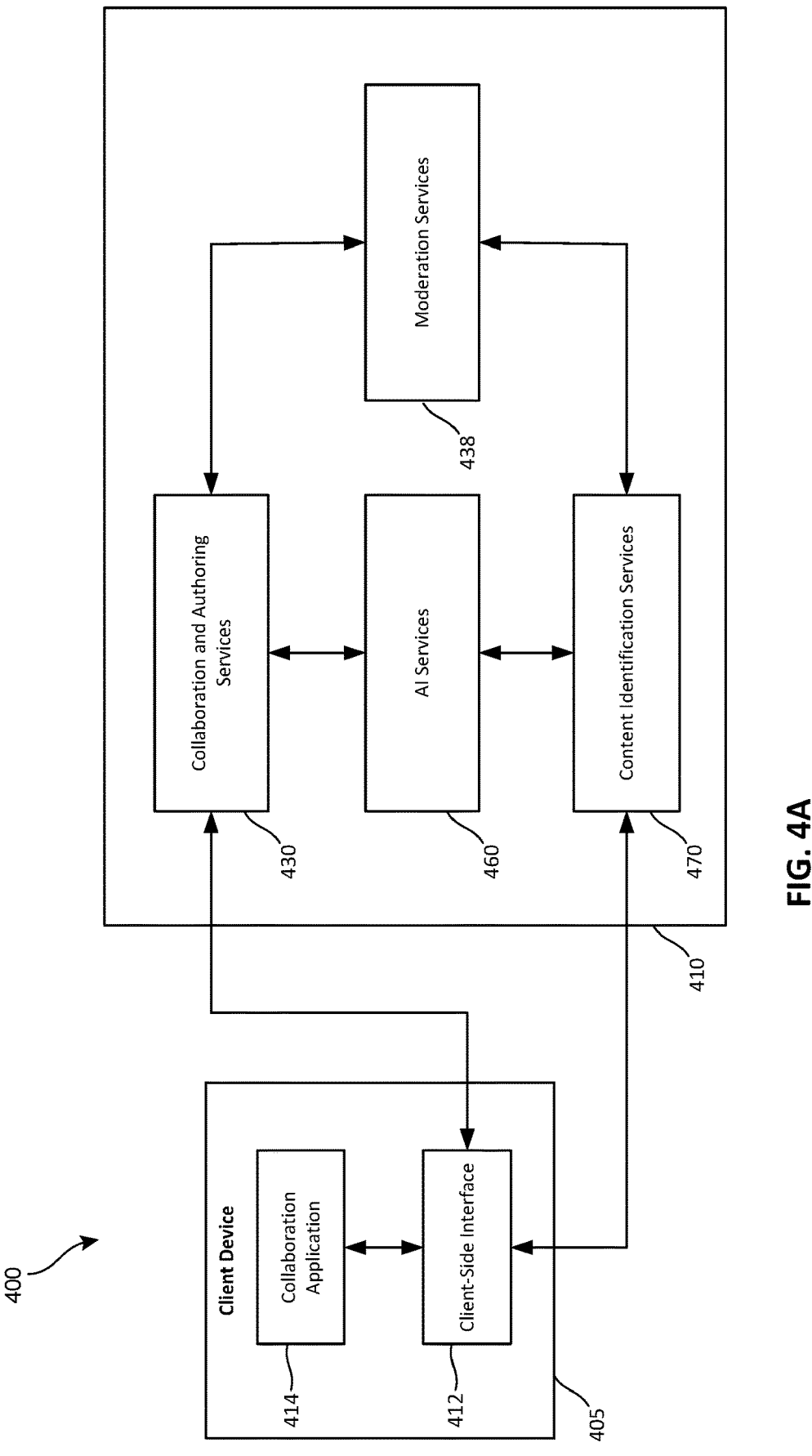
FIGS. 4A-4C are diagrams of an example computing environment in which the techniques disclosed herein for providing AI-powered aggregation of project-related collateral may be implemented.

FIG. 4A is a diagram showing an example computing environment 400 in which the techniques disclosed herein for providing AI-powered aggregation of project-related collateral may be implemented. The computing environment includes a device 405 and a collaboration platform 410. The collaboration platform includes the collaboration and authoring services 430, the AI services 460, and the content identification services 470.

The client device includes a collaboration application 414, which is a web-enabled native application that is configured to obtain content and/or services from the collaboration platform 410. The client-side interface 412 provides an interface for sending data from the collaboration application 414 to the collaboration platform 410 and for receiving data from the collaboration application 414 for the client device 405.

Figure 4B:
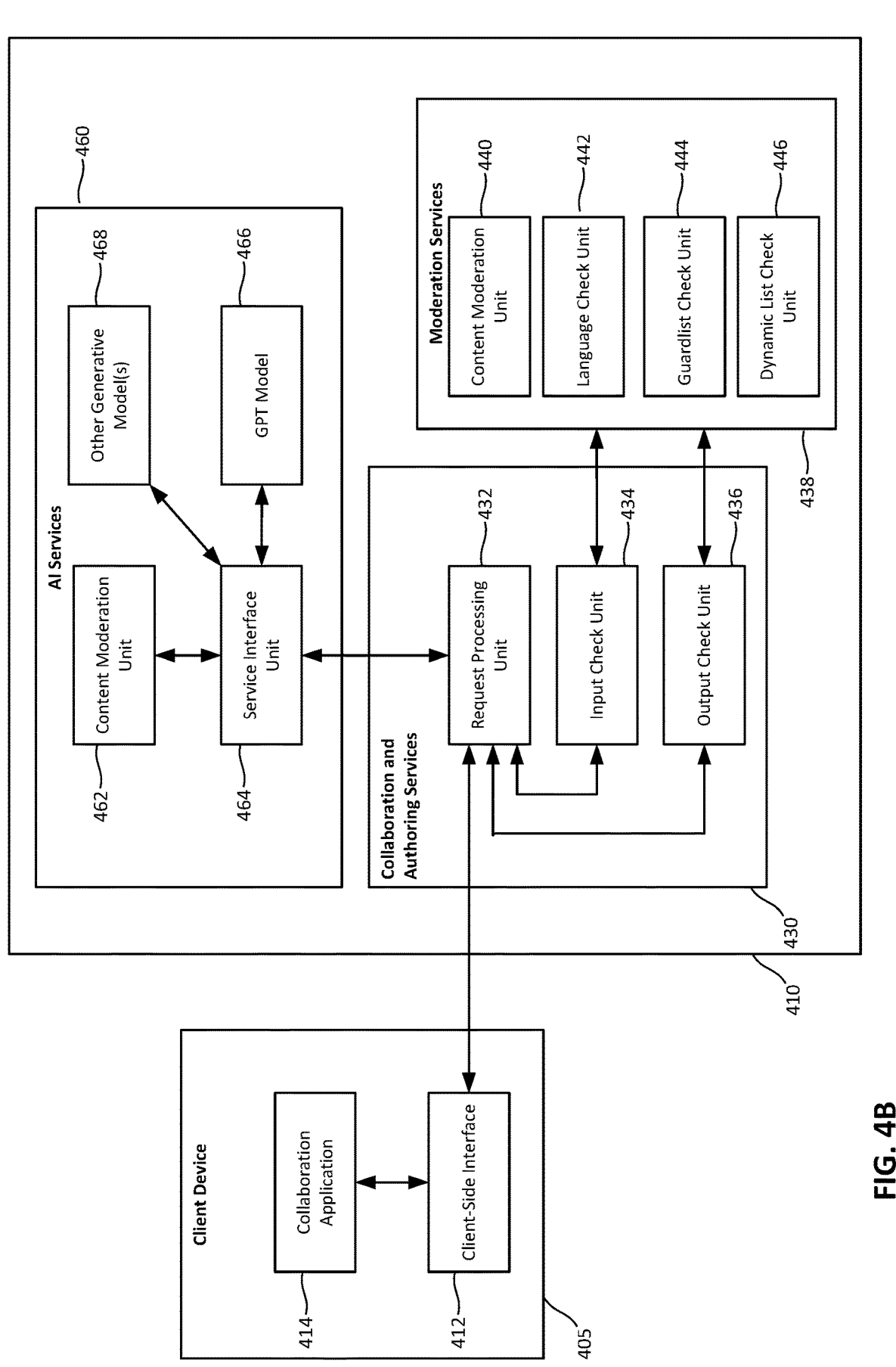
Figure 4C:
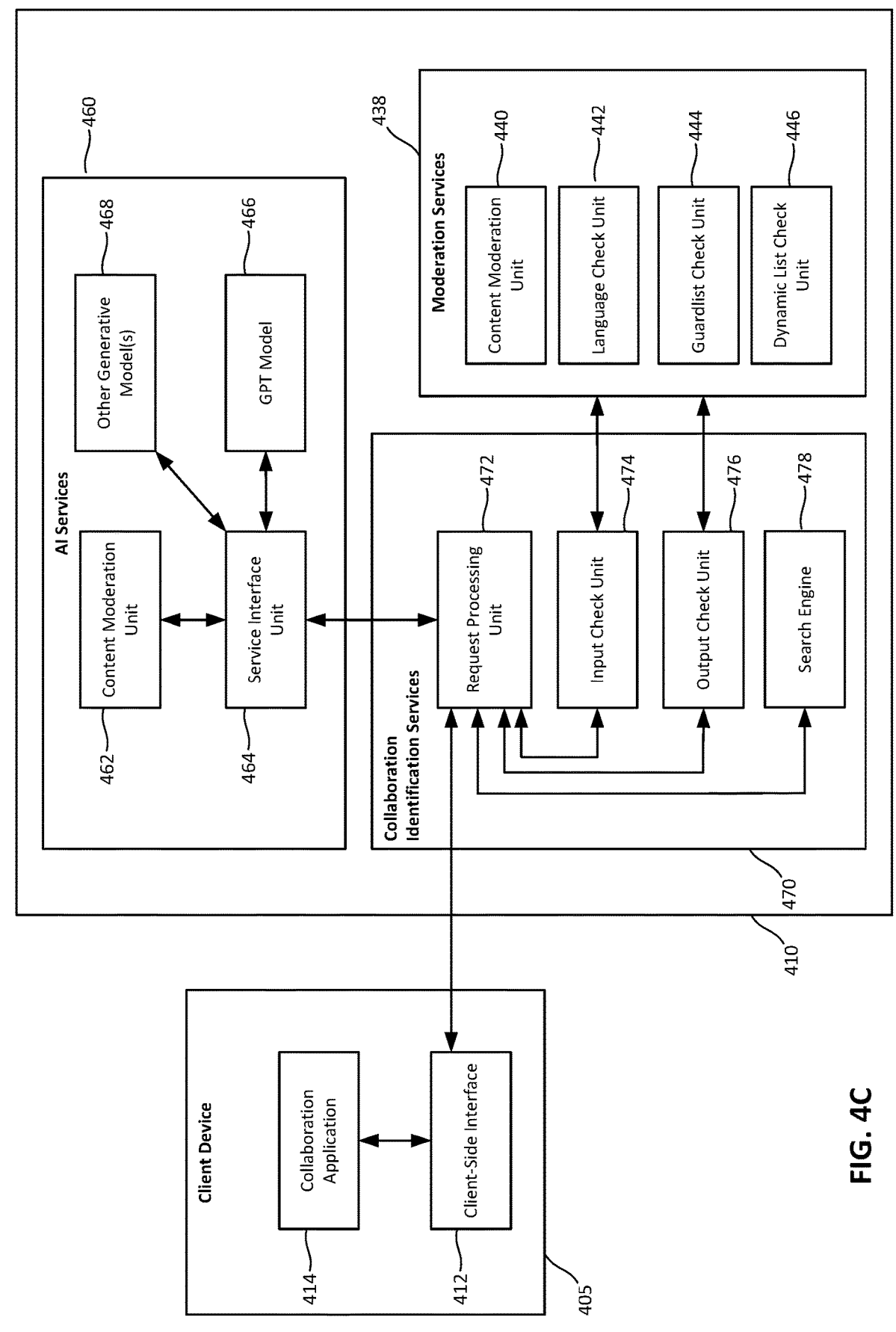

The collaboration and authoring services 430 provide various services for generating content using one or more generative models. FIG. 4B shows additional details of the collaboration and authoring services 430. The content identification services 470 are configured to identify candidate collateral items that may be associated with a workspace. FIG. 4C shows additional details of the content identification services 470.

FIG. 4B shows additional details of the client device 405 and the collaboration and authoring services 430 and the AI services 460 shown in FIG. 4A. The client device includes a collaboration application 414, which is a web-enabled native application that is configured to obtain content and/or services from the collaboration platform 410. The client-side interface 412 provides an interface for sending data from the collaboration application 414 to the collaboration platform 410 and for receiving data from the collaboration application 414 for the client device 405.

The collaboration and authoring services 430 include a request processing unit 432, an input check unit 434, an output check unit 436, and moderation services 438. The AI services 460 include a service interface unit 464, a GPT model 466, and a content moderation unit 462. The request processing unit 432 is configured to receive requests from the client-side interface 412 that include prompts for the GPT model 466 to generate content. The prompts can include a request to summarize content and/or otherwise generate content discussed in the preceding examples. In some implementations, the user or a collaborator can enter a textual prompt requesting content to be generated. The request processing unit 432 provides the prompt to the input check unit 434. The input check unit 434 submits the textual prompt the moderation services 438 for analysis. The moderation services 438 perform checks on the textual prompt and/or other inputs to ensure that these inputs do not include any potentially offensive language. The moderation services 438 performs several types of checks on the inputs to the GPT model 466 and the output from the GPT model 466. The content moderation unit 440 is implemented by a machine learning model trained to analyze the textual inputs to perform a semantic analysis on the content to predict whether the inputs include potentially offensive language. The language check unit 442 performs another check on the textual inputs using a second model configured to analysis the words and/or phrase used in textual content to identify potentially offensive language. The guardlist check unit 444 is configured to compare the language used in the inputs with a list of prohibited terms including known offensive words and/or phrases. The dynamic list check unit 446 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guardlist as the guardlist is updated. The specific checks performed by the moderation services 438 may vary from implementation to implementation. If one or more of these checks determines that that the textual prompt received from the client device 405 includes potentially offensive content, the request is rejected and the input check unit 434 provides an indication to the request processing unit 432 that the request has been rejected. The request processing unit 432 notifies the client device 405 that the request has been rejected. Otherwise, the request processing unit 432 provides the request to the AI services 460 for processing.

The service interface unit 464 of the AI services 460 receives the request from the request processing unit 432 and provides the textual prompt to the GPT model 466 as an input. The GPT model 466 analyzes these inputs and outputs AI-generated content based on these inputs. The AI service 460 also includes other generative models 468. The other generative models may be used to generate other types of content, such as but not limited to images, audio content, and video content. As discussed in the preceding example, the user interface 205 present action tiles in some implementations that enable the user to submit a request to generate these other types of content.

The service interface unit 464 provides the AI-generated content output by the GPT model 466 to the content moderation unit 462 for analysis. The content moderation unit 462 analyzes the content to identify any potentially offensive content included in the AI-generated content and provides an indication to the service interface unit 464 whether the AI-generated content passes or fails. The content moderation unit 462 is implemented similarly to the content moderation unit 440 in some implementations. The service interface unit 464 is configured to discard the AI-generated output if the content fails testing. Otherwise, the service interface unit 464 provides the AI-generated output to the request processing unit 432 for processing.

The request processing unit 432 provides the AI-generated content to the output check unit 436. The output check unit 436 operates similarly to the input check unit 434. The output check unit 436 provides the AI-generated content to the moderation services 438 for analysis. If the content fails one or more of the moderation checks, the output check unit provides an indication to the request processing unit 432 that the AI-generated content should be discarded. The request processing unit 432 may send another request to the AI services 460 for new content and/or send an indication to the client device 405 that an error occurred, and the request may be resubmitted. Otherwise, if the AI-generated content passes the moderation checks, the request processing unit 432 sends the AI-generated content to the client-side interface 412, and the client-side interface 412 provides the AI-generated content to the collaboration application 414 for presentation to the user. As discussed in the preceding examples, the AI-generated content may be presented to the user on the client device 405 of the user.

FIG. 4C shows additional details of the content identification services 470 shown in FIG. 4A. The content identification services 470 provide candidate collateral item recommendations that may be associated with a workspace.

The request processing unit 472 of the content identification services 470 receives requests to analyze textual content to identify keywords in natural language descriptions and/or titles of the workspace provided by users and suggest candidate collateral items based on these keywords. The request is provided by a web application of the collaboration platform 410 or a native application of the client device 405 in response to the user adding textual content to the description field 310 of the user interface 305 or modifying existing textual content. As discussed with respect to the example implementations shown in FIGS. 3A-3E, the user interface 305 includes a textual description field 310 in which the user can type a natural language description of the purpose of the workspace. The user interface 205 also includes a title field 210 which allows the user to associate a title with the workspace. In some implementations, the title is provided by the client device 405 with the natural language description to the generative model for analysis, because the title often represents a concise description of the workspace that may include keywords or concepts that can be used to identify candidate collateral items.

The request processing unit 472 provides this natural language description and/or the title to the AI services 460 to identify keywords included in the textual description. The AI services 460 uses the GPT model 466 to generate the keywords. The AI services 460 formulates a textual prompt to the GPT model 466 based on the natural language description and/or the title. In some implementations, the AI services 460 generate the prompt by concatenating the natural language description and the title into a single textual string which is provided to the GPT model 466 as an input. In some implementations, the AI services 460 add a tag to the natural language descriptions and the title so that the model can identify which parts of the prompt are related to the natural language description and which parts are related to the title.

The textual input received from the client device 405 is provided to the input check unit 474, which operates similar to the input check unit 474. The input check unit 474 provides the textual input to the moderation services 438 to ensure that the textual input does not include any potentially objectionable language. The request processing unit 472 also provides the keywords received from the AI services 460 to the moderation service 438 to ensure that the keywords do not include any potentially objectional language. A textual input or keywords that are predicted to include objectionable language are discarded by the request processing unit 472, and the request processing unit 472 sends an indication to the client-side interface 412 that the request has failed and may be resubmitted. The keywords generated by the AI services 460 are provided to the client-side interface 412 if the moderation service 438 does not indicate that the keywords include potentially objectionable language. The client-side interface 412 provides these keywords to the collaboration application 414, which highlights or otherwise emphasizes these keywords, as shown in FIGS. 3C-3F. A technical benefit of highlighting the keywords is that this approach informs the user as to which words of the description that the GPT model 466 predicted are important words or concepts in the textual description provided by the user. This provides the user with the ability to modify the textual description for the workspace if the keywords identified by the model are not relevant to the workspace being created. In some implementations, the request processing unit 472 stores the textual description of the workspace input by the user and the keywords in the workspace datastore 525 shown in FIG. 5B.

The request processing unit 472 automatically formulates a search query or queries for the search engine 478 based on the keywords identified in the natural language description and/or the title of the workspace. A technical benefit of this approach is that the user does not need to understand how to formulate or structure a query for search engine 478. In some implementations, the request processing unit 472 generates a separate query formulated for each of the keywords and provided to the search engine 478 to facilitate presenting the candidate collateral items grouped by keyword as shown in FIGS. 3D and 3E. In other implementations, the request processing unit 472 formulates a single query including the keywords to the search engine 478, and the search results include an indication which keywords are associated with each candidate collateral items 330 identified by the search engine. The search engine 478 is configured to search one or more enterprise or organization-specific data stores where content is stored in some implementations. The electronic content stored in one or more data stores may be associated with metadata that identifies attributes of the electric content. In some implementations, this metadata is generated and indexed as the electronic content is stored in the one or more datastores to facilitate searching of the data stores. The datastores may be located on different servers and/or in different storage locations on a server or servers. In a non-limiting example, white papers and journal articles are stored in a first persistent storage, functional design documents and other technical documents are stored in a second persistent storage, program code is stored in a third persistent storage, and email and/or other messages related to a project are stored in a fourth persistent storage. These persistent storage locations may be maintained in memory on the collaboration platform 410 or may be implemented on external servers (not shown) which are accessible from the collaboration platform 410. The specific types of candidate collateral items which are available and where these items are stored may vary for different implementations.

Information identifying the candidate collateral items identified by the search engine 478 are provided to the client-side interface 412, and the client-side interface 412 provides the information identifying the candidate collateral items to the collaboration application 414. The user interface 305 uses this information to present the candidate collateral items 330. In some implementations, the candidate collateral items are also presented to the AI services 460 so that a thumbnail image or icon representing each of the candidate collateral items 330 are generated. The other generative models 468 of the AI service 460 can include such an image or icon generation model. Furthermore, the candidate collateral items are presented to the GPT model 466 or other generative model in some implementations to obtain a summary or short description of the candidate collateral items that is provided to the client-side interface 412 with the candidate collateral items. The client-side interface 412 causes the summary to be presented with the candidate collateral items. In some implementations, the user may click on, hover a pointer over, or otherwise activate a candidate collateral items 330 on the user interface 305 to cause the user interface to display the summary of the candidate collateral item. This provides the user with a preview of the content of the candidate collateral item without having to open and review the candidate collateral item themselves, which can significantly improve the user experience by enabling the user to quickly determine whether a candidate collateral item should be added to the workspace or may require further review.

Figure 5A:
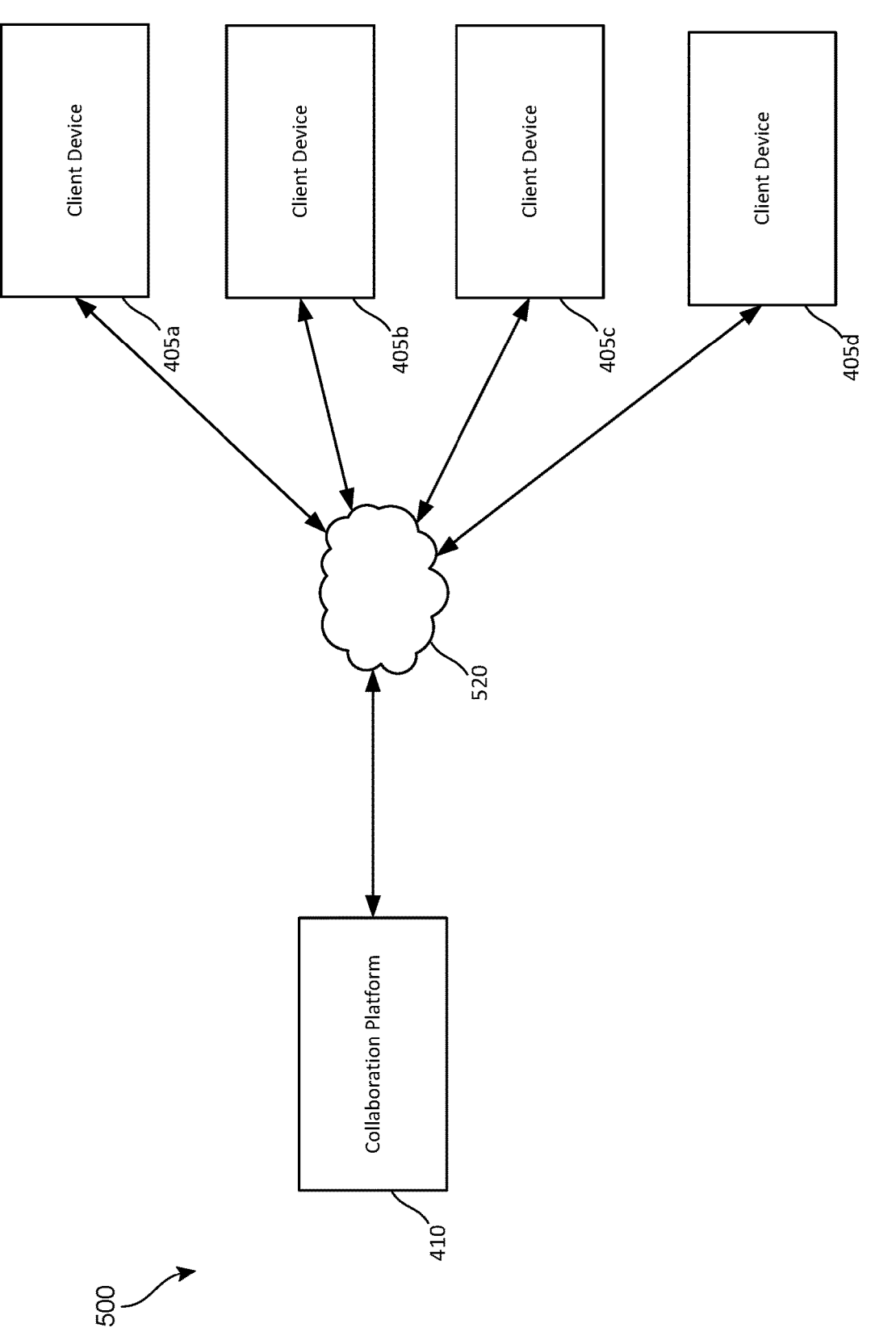
FIGS. 5A and 5B are diagrams showing additional features of the collaboration platform and the client device shown in FIGS. 4A-4C.

FIG. 5A is a diagram showing an example computing environment 500 in which the techniques disclosed herein for providing AI-powered aggregation of project-related collateral may be implemented. The computing environment 400 shows various elements associated with an implementation of a collaboration platform 410 and client devices 405a-405d (collectively referred to as client device 405). The collaboration platform 410 provides tools that enable multiple users to collaborate with one another in a cohesive manner to create, prepare, review, and/or format various types of electronic content. As discussed in the preceding examples, the collaboration platform can implement the user interfaces shown in FIGS. 1-3J. Users may access the services provided from a client device, such as the client devices 405a-405d. The client devices 405a-405d communicate with the collaboration platform 410 via the network 520. The network 520 may be a combination of one or more public and/or private networks and may be implemented at least in part by the Internet.

In the example shown in FIG. 5A, the collaboration platform 410 is implemented as a cloud-based service or set of services. The collaboration platform 410 implements the functionality for providing the AI-powered aggregation of project-related collateral as discussed with regard to FIGS. 1-3J.

The client devices 405a, 405b, 405c, and 405d are each a computing device that are implemented as a portable electronic device, such as a mobile phone, a tablet computer, a laptop computer, a portable digital assistant device, a portable game console, and/or other such devices in some implementations. The client devices 405a, 405b, 405c, and 405d are also implemented in computing devices having other form factors, such as a desktop computer, vehicle onboard computing system, a kiosk, a point-of-sale system, a video game console, and/or other types of computing devices in other implementations. While the example implementation illustrated in FIG. 5A includes four client devices, other implementations may include a different number of client devices that utilize the collaboration platform 410. Furthermore, in some implementations, a portion of the functionality provided by the collaboration platform 410 is implemented by a native application installed on the client devices 405a, 405b, 405c, and 405d, and the client devices 405a, 405b, 405c, and 405d communicate directly with the collaboration platform 410 over a network connection.

Figure 5B:
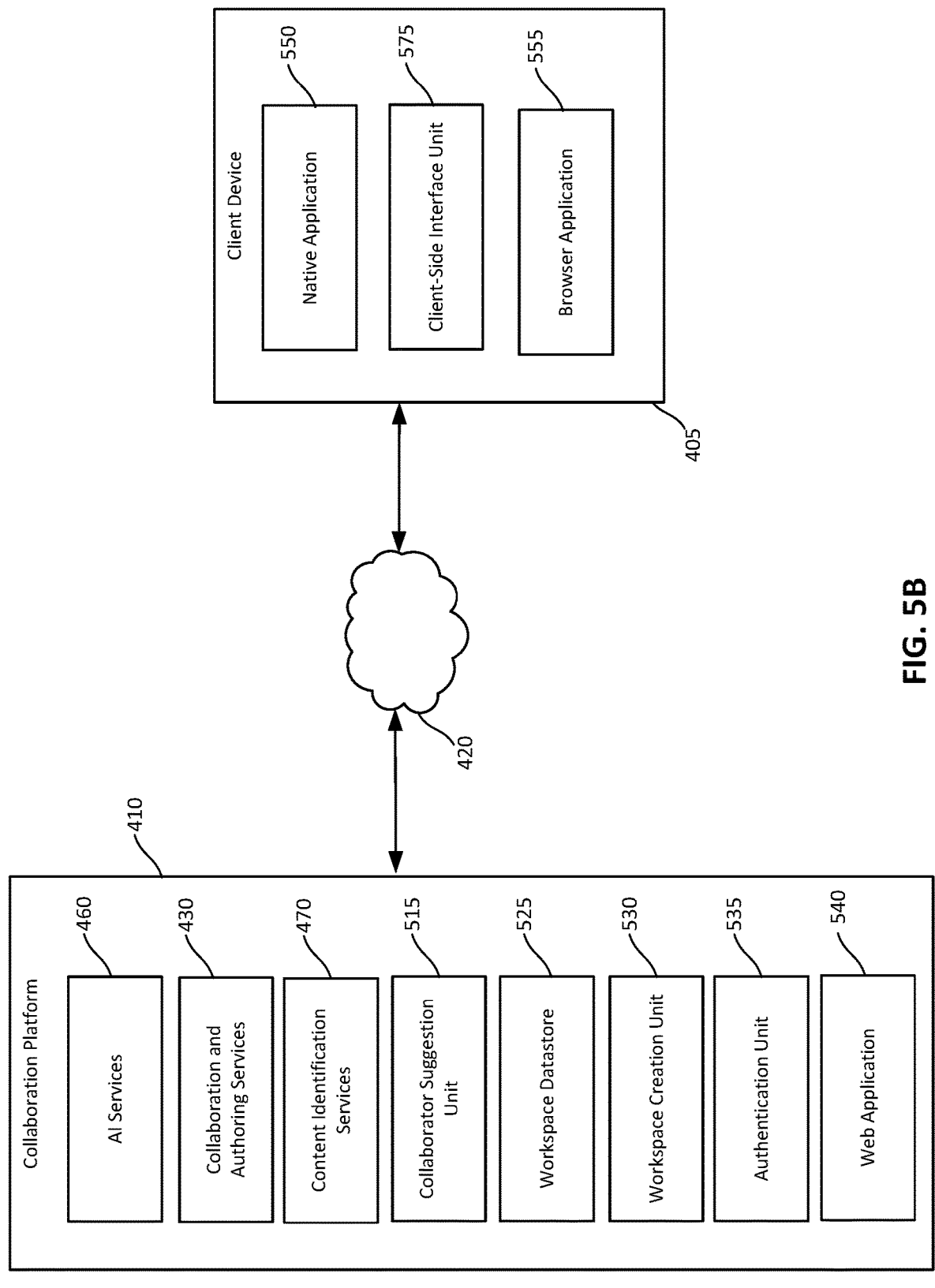

FIG. 5B is a diagram showing additional features of the collaboration platform 410 and the client device 405. The collaboration platform 410 includes the AI services 460, the collaboration and authoring services 430, the content identification services 470, a collaborator suggestion unit 515, a workspace datastore 525, workspace creation unit 530, an authentication unit 535, and a web application 540.

The collaboration platform 410 receives requests from the web application 540 or the native application 550 of the client device 405. The requests include requests to analyze textual content to identify keywords in a textual prompt provided by the user, such as the textual content entered into the textual description field 310 of the user interface 305 discussed in the preceding examples. The requests to analyze the textual content to identify keywords and suggest content based on the keywords are provided to the AI service 460 for analysis to obtain the keywords as discussed with respect to FIG. 4C. The collaboration platform 410 also receives requests to summarize content and/or generate other types of content from existing content. These requests to generate content are also provided to the AI service 460 for analysis to obtain the keywords as discussed with respect to FIG. 4C. The requests received by the collaboration platform 410 also include requests for suggestions for collaborators that may be invited to collaborate on a project via a workspace, such as the list of collaborators 235 discussed in the preceding examples. The requests for suggestions for collaborators are provided to the collaborator suggestion unit 515 for processing. The requests received by the collaboration platform 410 also includes requests to create a new workspace. The request includes an indication that the user has selected one or more candidate collateral items to be associated with the workspace being created in some implementations. The request to create the new workspace is provided to the workspace creation unit 530. Other types of requests may be implemented in other implementations in addition to or instead of those discussed above.

As discussed with respect to FIGS. 3D and 3E, the user can click on or otherwise interact with the candidate collateral items 330 to select candidate collateral items to be associated with the workspace. The tabbed user interface shown in FIGS. 3D and 3E allows the user to show all of the candidate collateral items 330 or to show the candidate collateral items 330 that are associated with a particular keyword. A technical benefit of this approach is that the user can select the tab associated with a particular keyword to quickly identify which candidate collateral items 330 were identified as being associated with that keyword. This approach improves the usability of the user interface 305 by allowing the user to quickly identify which keywords have provided relevant search results and those that have not provided relevant search results. The user may refine the search by editing the natural language prompt in in the description field 310 or may click on otherwise activate the create workspace option 315 on the user interface 305 to cause the new workspace to be created.

The workspace creation unit 530 creates a new workspace in response to a request to create the new workspace created by the web application 540 or the native application 550 in response to the user clicking on or otherwise activating the create workspace option 315 on the user interface 305. The request includes an indication whether the user has selected any candidate collateral items to be associated with the workspace being created in some implementations. The workspace creation unit 530 creates an entry for the new workspace in the workspace datastore 525. The workspace creation unit 530 updates the entry to associate the selected candidate collateral items with the workspace. The collaboration platform 410 causes the user interface 350 shown in FIG. 3F to be presented to the user once the workspace has been created.

The collaborator suggestion unit 515 provides suggestions for collaborators that the user may wish to invite to collaborate on a project via the workspace. The request for suggestions for collaborators may be an initial request, such as that shown in FIGS. 2A and 2B, where a new workspace is being created. The request for suggestions for collaborators may also be a performed once the workspace has been created. Where a new workspace is being created, the title of the workspace is used to provide context for searching for potential collaborators. Where the workspace has already been created, the title of the workspace, the natural language description of the workspace and/or the keywords derived from the language description, and the collaborators who have already been invited to participate in the workspace may all be considered when searching for candidate collaborators. In some implementations, the collaboration platform 410 has access to which users have collaborated with one another in the past, which users have worked on certain types of categories of projects, the roles that users have within their respective project teams or divisions, and the type of work being done by the various project teams or divisions associated with the enterprise or organization. In some implementations, the search for collaborators is performed using a collaboration suggestion model that is configured to receive the various information described above as an input and to output the list of candidate collaborators.

The authentication unit 535 provides functionality for verifying whether users are permitted to access the services provided by the collaboration platform 410. In some implementations, the authentication unit 535 provides functionality for receiving authentication credentials for the users from the respective client device 405 of the user. The authentication unit 535 verifies that the authentication credentials are valid and permits the users to access the services provided by the collaboration platform 410 responsive to the authentication credentials being valid.

The client device 405 includes native applications 550 and/or a browser application 555. The native application 550 communicates with the collaboration platform 410 to enable users to consume, create, share, collaborate on, and/or modify content using the services provided by the collaboration platform 410. The native application 550 also provides the user with the ability to create new workspaces, modify existing workspaces, and to invite other users to collaborate in workspaces. The native application 550 implements the user interfaces shown in FIGS. 1, 2A, 2B, and 3A-3J in such implementations.

The browser application 555 is an application for accessing and viewing web-based content, the web-based content may be provided by the web application 540 of the collaboration platform 410. The web application 540 enables users to consume, create, share, collaborate on, and/or modify content. A user of the client device 405 may access the web application 540 via the browser application 555, and the browser application 555 renders a user interface for interacting with the collaboration platform 410 in the browser application 555. In some implementations, the web application provides user interfaces such as those shown in FIGS. 1, 2A, 2B, and 3A-3J which are presented to the user in the browser application 555.

The collaboration platform 410 supports both the web-enabled native applications 550 and the web application 540 in some implementations, and the users may choose which approach best suits their needs. The collaboration platform 410 provides support for the native application 550, the browser application 555, or both to provide functionality for a user of the client device 405 to obtain the services provided by the collaboration platform 410.

FIG. 6A is a flow chart of an example process 600 for identifying project-related collateral. The process 600 can be implemented by the collaboration platform 410 shown in the preceding examples.

The process 600 includes an operation 605 of receiving, from a first client device 405 over a first network connection, first textual content inserted into a user interface element of a first user interface on the first client device 405. The first textual content includes a natural language description of a first project for which a first workspace is to be created. The first textual content may be obtained from the user interface 305 shown in FIGS. 3A-3E. The first workspace is associated with collateral items associated with the first project and collaborator information identifying users who are permitted to access the workspace and collaborate on the project collateral. As discussed in the preceding examples, the workspace provides the user with a means for aggregating project-specific collateral in a single workspace that is accessible to the user creating the workspace as well as any collaborators that are invited to participate in the workspace.

The process 600 includes an operation 610 of analyzing the first textual content to obtain first keywords in the first textual content using a first NLP model trained to receive the textual content and to output the first keywords. As shown in FIGS. 3C-3E, the collaboration platform 410 analyzes the natural language description of the workspace provided by the user to identify keywords in the description. As discussed in the preceding examples, this approach of automatically identifying keywords in the textual description provided by the user has several technical benefits. A first technical benefit of this approach is that the model automatically identifies and presents the keywords to the user. Thus, the user can describe the workspace using language in the way that the user is comfortable without having to determine the appropriate keywords to use for formulating a search query. A second technical benefit of this approach is that the model automatically identifies keywords in the natural language description and/or the title that the user may not have otherwise thought of or identified. Consequently, the search for project-related collateral is significantly more efficient than a trial-and-error approach in which the user attempts to identify appropriate keywords to utilize in a search query.

The process 600 includes an operation 615 of generating a search query for candidate collateral items in one or more datastores of electronic content based on the first keywords and an operation 620 of providing the search query as an input to a first search engine to cause the first search engine to execute the search query to identify the candidate collateral items by comparing the first keywords to metadata associated with the electronic content of the one or more datastores. As discussed in the preceding examples, the request processing unit 472 automatically formulates a search query or queries for the search engine 478 based on the keywords identified in the natural language description and/or the title of the workspace.

The process 600 includes an optional operation 625 of analyzing the candidate collateral items using one or more generative models to generate a representation of the content of the candidate collateral items. In some implementations, representation of the candidate collateral items may be generated by the client device based on metadata and/or file information associated with the candidate collateral items. As discussed in the preceding examples, the AI services 460 can be used to generate a representation of each candidate collateral item including at least one of an image representing the candidate collateral item and a textual summary of the candidate collateral item.

The process includes an operation 630 of causing the first client device to present the representations of the candidate collateral items on the first user interface. Each representation is associated with a control, which when activated, causes the first user interface to present the textual summary of the candidate collateral item. In some implementations, this control may be represented by a graphical representation of the candidate collateral item, such as that shown in FIGS. 3E and 3E and the user interface is configured to display the summary when the user clicks on, hovers over, touches, or otherwise activates the graphical representation of the candidate collateral item. In some implementations, the summary is not created until the user clicks on, hovers over, touches, or otherwise activates the graphical representation of the candidate collateral item.

The process 600 includes an operation 635 of receiving, from the first client device, a first user input selecting one or more of the collateral items from among the candidate collateral items to be associated with the first workspace. The user can select collateral items from among the candidate collateral items to be associated with the workspace being created. The selected collateral items are then associated with the workspace and a list of the associated items are presented to the users accessing the workspace as shown in FIGS. 3G-I. The collaboration platform 410 includes a workspace datastore in some implementations. The workspace datastore provides persistent storage for storing data structures representing the workspaces created by the users. The workspace datastore includes a workspace data structure representing each of the workspaces. An example of such a workspace data structure is shown in FIG. 9A. The workspace datastore also includes data structures for storing collaborator information for the users who have created a workspace and/or have been invited to collaborate on a workspace. An example of such a collaborator data structure. The collaborator datastore also includes collateral item data structures for storing information about the collateral items associated with each of the workspaces. An example of such a collateral item data structure is shown in FIG. 9B.

The process 600 includes an operation 640 of updating one or more data structures in a workspace datastore associating each of the one or more candidate collateral items with the first workspace. As discussed in the preceding examples, the workspace datastore is a persistent datastore in a memory of the data processing system. Examples of one implementation of the data structures shown in FIGS. 9A-9C.

The process 600 includes an operation 645 of causing the first client device to present a second workspace user interface representing the first workspace, the second workspace user interface presenting the one or more of the collateral items associated with the first workspace, the second workspace being accessible to one or more users to collaborate on the one or more collateral items associated and other content. An example of such a second user interface is shown in FIG. 3G-I.

FIG. 6B is a flow chart of an example process 650 for identifying project-related collateral. The process 650 can be implemented by the collaboration platform 410 shown in the preceding examples.

The process 650 includes an operation 655 of receiving, from a first client device, first textual content inserted into a user interface element of a first user interface on the first client device. The first textual content includes keywords associated with a first project for which a first workspace is to be created. The first workspace is associated with collateral items associated with the first project, the workspace is also associated with collaborator information identifying users who are permitted to access the workspace and collaborate on the project collateral. As discussed in the preceding examples, the workspace provides the user with a means for aggregating project-specific collateral in a single workspace that is accessible to the user creating the workspace as well as any collaborators that are invited to participate in the workspace. As discussed in the preceding examples, the user creating the workspace may provide a set of keywords to be provided to the search engine instead of a natural language description of the workspace to be created. In yet other implementations, the user provides a set of keywords and a natural language description, and the natural language description is analyzed to extract keywords from the natural language description using the techniques described in the preceding examples. The keywords provided by the user and those extracted from the natural language description are provided to the search engine in such implementations.

The process 650 includes an operation 660 of conducting a search for candidate collateral items associated with each of the keywords using a first search engine, and an operation 665 of causing the first client device to present the candidate collateral items on the first user interface. The collaboration platform 410 searches for candidate collateral items to be presented to the user. An example of such search results is shown in FIGS. 3D and 3E.

The process 650 includes an operation 670 of receiving, from the first client device, a first user input selecting one or more of the collateral items from among the candidate collateral items. The user can select collateral items from among the candidate collateral items to be associated with the workspace being created. The selected collateral items are then associated with the workspace and a list of the associated items are presented to the users accessing the workspace as shown in FIGS. 3G-I. As discussed above, the collaboration platform 410 updates a workspace datastore in some implementations to associate the collateral items with the workspace.

The process 650 includes an operation 675 of causing the first client device to present a second workspace user interface representing the first workspace, the second workspace user interface presenting the one or more of the collateral items associated with the first workspace, the second workspace being accessible to one or more users to collaborate on the one or more collateral items associated and other content. An example of such a second user interface is shown in FIG. 3G-I.

The process 650 includes an operation 680 of receiving an indication of a selection of a first collateral item of the one or more collateral items presented on the second workspace user interface. As discussed in the preceding examples, the user interface 350 can include a menu 354 that provides the user with options for performing various actions on a selected collateral item. In the example implementation shown in FIG. 3H, only two options are presented, but other implementations may provide additional actions that can be performed on the selected collateral item in addition to or instead of the example actions shown in FIG. 3H.

The process 650 includes an operation 685 of analyzing the first candidate collateral item with a Generative Pre-trained Transformer (GPT) model to obtain a summary of the candidate collateral item. The user interface 350 causes the collaboration platform 410 to submit the collateral item and a prompt associated with the specific menu item selected to the AI services 460 for processing. The AI services 460 analyze the prompt with the GPT model 466 and/or the other generative models 468 to generate content to be presented to the user.

The process 650 includes an operation 690 of causing the first client device to present the generated content based on the first collateral item on the second workspace user interface. As discussed in the preceding examples, the generated content may be text-based content and/or other types of generated content.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
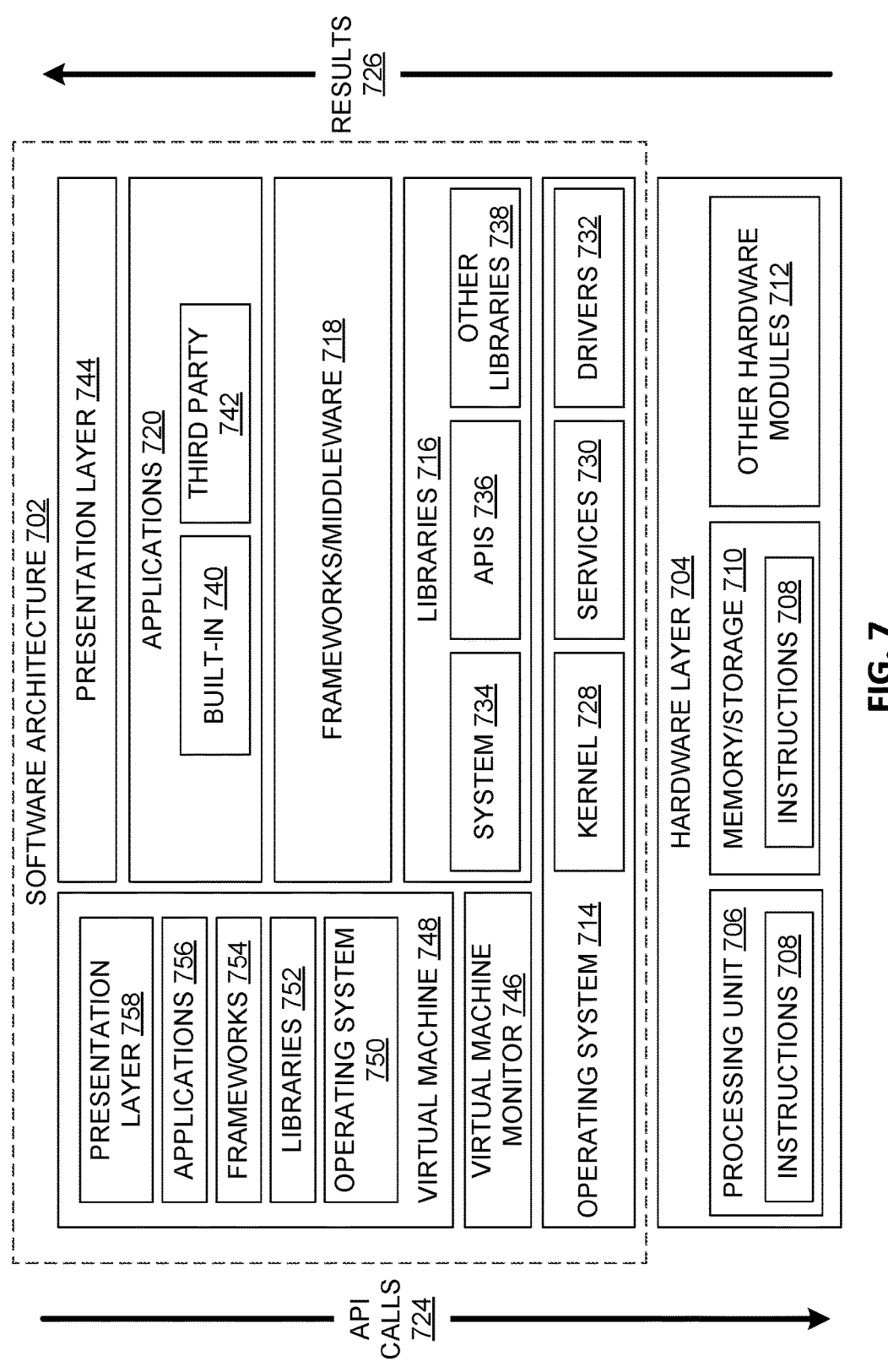
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
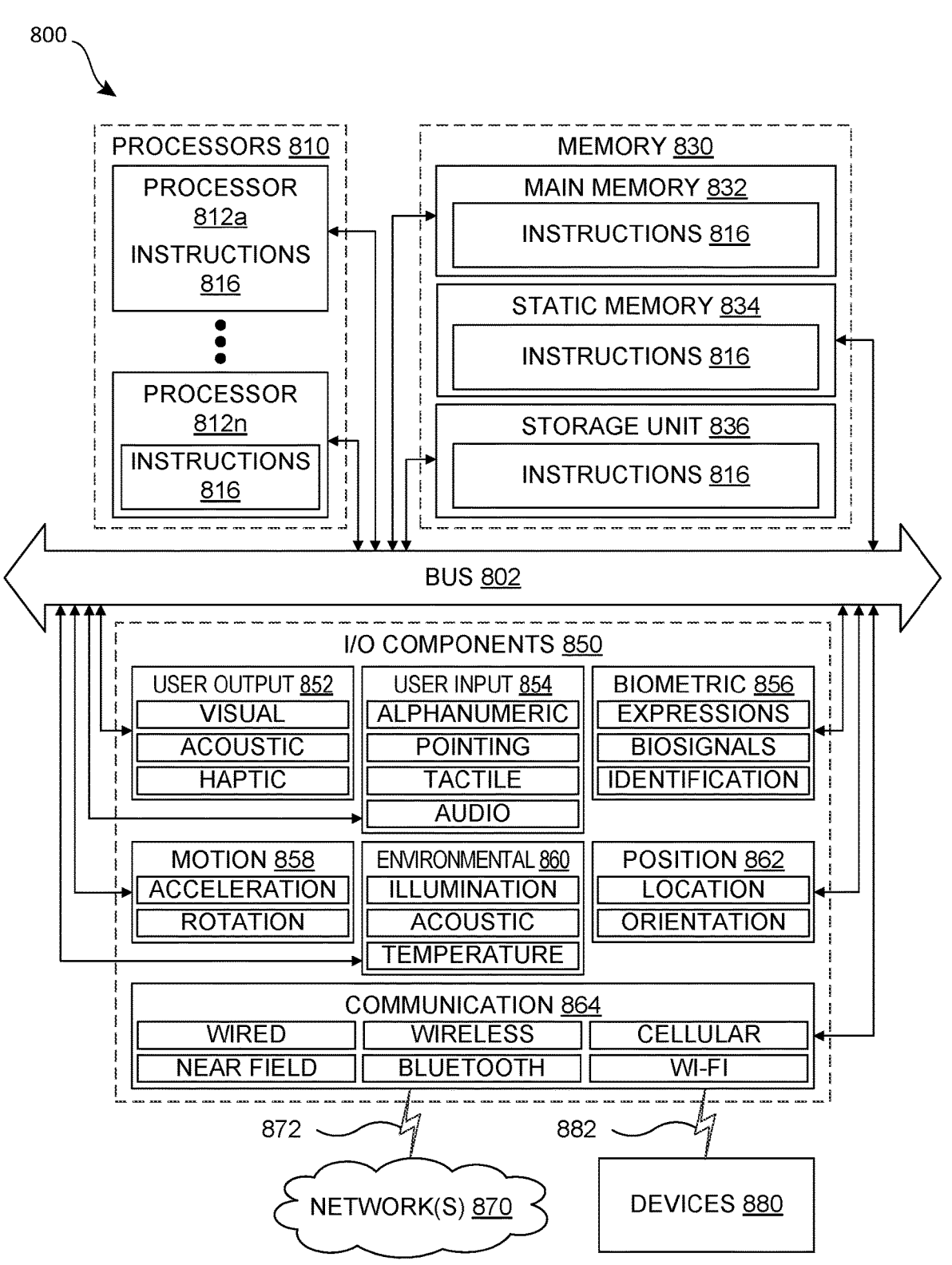
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882.

The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
 receiving, from a first client device over a first network connection, a first textual content inserted into a user interface element of a first user interface on the first client device, the first textual content comprising a natural language description of a first project for which a first workspace is to be created, the first workspace being associated with collateral items associated with the first project, the first workspace also being associated with collaborator information identifying users who are permitted to access the first workspace and collaborate on the collateral items associated with the first project;
 analyzing the first textual content to obtain first keywords in the first textual content using a first natural language processing (NLP) model trained to receive the first textual content and to output the first keywords;
 generating a search query for candidate collateral items in one or more datastores of electronic content based on the first keywords;
 providing the search query as an input to a first search engine to cause the first search engine to execute the search query to identify the candidate collateral items by comparing the first keywords to metadata associated with the electronic content of the one or more datastores;
 analyzing the candidate collateral items using one or more generative models to generate representations of content of the candidate collateral items, the representations of a respective candidate collateral item including at least one of an image representing the respective candidate collateral item and a textual summary of the respective candidate collateral item;

causing the first client device to present the representations of the candidate collateral items on the first user interface, each representation being associated with a control, which when activated, causes the first user interface to present the textual summary of a candidate collateral item associated with the control, wherein the first user interface is a tabbed user interface, wherein each tab is associated with a respective keyword of the first keywords and presents a subset of the representations of candidate collateral items associated with the respective keyword;
 receiving, from the first client device, a first user input via the first user interface, the first user input selecting one or more collateral items from among the candidate collateral items to be associated with the first workspace;
 updating one or more data structures in a workspace datastore associating each collateral item of the one or more collateral items with the first workspace, the workspace datastore comprising a persistent datastore in a memory of the data processing system; and
 causing the first client device to present a second workspace user interface representing the first workspace, the second workspace user interface presenting representations of the one or more collateral items associated with the first workspace, the second workspace user interface being accessible to one or more users to collaborate on the one or more collateral items associated and other content.

2. The data processing system of claim 1, wherein the machine-readable medium includes instructions configured to cause the processor to perform operations of:
 identifying candidate collaborators to participate in the first workspace to collaborate on the first project; and
 presenting the candidate collaborators on the first user interface.

3. The data processing system of claim 2, wherein identifying candidate collaborators further comprises identifying the candidate collaborators based on a title associated with a first workspace.

4. The data processing system of claim 3, wherein identifying candidate collaborators further comprises identifying the candidate collaborators based on the natural language description of a first project, the first keywords, or both.

5. The data processing system of claim 4, wherein identifying the candidate collaborators further comprises identifying the candidate collaborators based on people who have recently communicated with a first user associated with the first client device, people who are proximate to the first user within an organizational hierarchy, or both.

6. The data processing system of claim 2, wherein the machine-readable medium includes instructions configured to cause the processor to perform operations of:
 receiving an indication selecting one or more of the candidate collaborators from among the candidate collaborators; and
 sending an invitation to client devices associated with the one or more candidate collaborators inviting the candidate collaborators to participate in the first workspace.

7. The data processing system of claim 6, wherein generating the search query further comprises constructing the search query using the first keywords and the indication selecting the one or more candidate collaborators from among the candidate collaborators.

8. The data processing system of claim 1, wherein updating the one or more data structures in a workspace datastore associating each collateral item of the one or more collateral items with the first workspace, the workspace datastore comprising a persistent datastore further comprises:

creating a collateral item data structure for each of the one or more collateral items to be associated with the first workspace; and associating the collateral item data structure for each of the one or more collateral items with a workspace data structure associated with the first workspace.

9. The data processing system of claim 1, wherein the machine-readable medium includes instructions configured to cause the processor to perform operations of:

receiving an indication of a selection of a candidate collateral item of the candidate collateral items;

analyzing the candidate collateral item with a Generative Pre-trained Transformer (GPT) model to obtain a summary of the candidate collateral item; and causing the first client device to present the summary of the candidate collateral items on the first user interface.

10. The data processing system of claim 1, wherein the machine-readable medium includes instructions configured to cause the processor to perform operations of:

analyzing the candidate collateral item to provide one or more of a preview of the candidate collateral item, a recent edit history of the candidate collateral item, or both.

11. A method implemented in a data processing system for identifying project-related collateral, the method comprising:

receiving, from a first client device over a first network connection, a first textual content inserted into a user interface element of a first user interface on the first client device, the first textual content comprising a natural language description of a first project for which a first workspace is to be created, the first workspace being associated with collateral items associated with the first project, the first workspace also being associated with collaborator information identifying users who are permitted to access the first workspace and collaborate on the collateral items associated with the first project;

analyzing the first textual content to obtain first keywords in the first textual content using a first natural language processing (NLP) model trained to receive the first textual content and to output the first keywords;

generating a search query for candidate collateral items in one or more datastores of electronic content based on the first keywords;

providing the search query as an input to a first search engine to cause the first search engine to execute the search query to identify the candidate collateral items by comparing the first keywords to metadata associated with the electronic content of the one or more datastores;

analyzing the candidate collateral items using one or more generative models to generate representations of content of the candidate collateral items, the representations of a respective candidate collateral item including at least one of an image representing the respective candidate collateral item and a textual summary of the respective candidate collateral item;

causing the first client device to present the representations of the candidate collateral items on the first user interface, each representation being associated with a control, which when activated, causes the first user interface to present the textual summary of a candidate collateral item associated with the control, wherein the first user interface is a tabbed user interface, wherein each tab is associated with a respective keyword of the first keywords and presents a subset of the representations of the candidate collateral items associated with the respective keyword;

receiving, from the first client device, a first user input via the first user interface, the first user input selecting one or more collateral items from among the candidate collateral items to be associated with the first workspace;

updating one or more data structures in a workspace datastore associating each collateral item of the one or more collateral items with the first workspace, the workspace datastore comprising a persistent datastore in a memory of the data processing system; and causing the first client device to present a second workspace user interface representing the first workspace, the second workspace user interface presenting representations of the one or more collateral items associated with the first workspace, the second workspace user interface being accessible to one or more users to collaborate on the one or more collateral items associated and other content.

12. The method of claim 11, further comprising:

identifying candidate collaborators to participate in the first workspace to collaborate on the first project; and presenting the candidate collaborators on the first user interface.

13. The method of claim 12, wherein identifying candidate collaborators further comprises identifying the candidate collaborators based on a title associated with a first workspace.

14. The method of claim 13, wherein identifying candidate collaborators further comprises identifying the candidate collaborators based on the natural language description of a first project, the first keywords, or both.

15. The method of claim 14, wherein identifying candidate collaborators further comprises identifying the candidate collaborators based on people who have recently communicated with a first user associated with the first client device, people who are proximate to the first user within an organizational hierarchy, or both.

16. A data processing system comprising:

a processor; and a machine-readable medium storing executable instructions that, when executed, cause the processor to perform operations comprising:

receiving, from a first client device, a first textual content inserted into a user interface element of a first user interface on the first client device, the first textual content comprising keywords associated with a first project for which a first workspace is to be created, the first workspace being associated with collateral items associated with the first project, the first workspace also being associated with collaborator information identifying users who are permitted to access the first workspace and collaborate on the collateral items associated with the first project;

conducting a search for candidate collateral items associated with each of the keywords using a first search engine;

causing the first client device to present the candidate collateral items on the first user interface, wherein the first user interface is a tabbed user interface, wherein each tab is associated with a respective keyword of the keywords associated with the first project and presents a subset of the candidate collateral items associated with the respective keyword;

receiving, from the first client device, a first user input selecting one or more collateral items from among the candidate collateral items to associate with the first workspace;

causing the first client device to present a second workspace user interface representing the first workspace, the second workspace user interface presenting the one or more collateral items associated with the first workspace, the second workspace user interface being accessible to one or more users to collaborate at least on the one or more collateral items associated with the first workspace;

receiving an indication of a selection of a first collateral item of the one or more collateral items presented on the second workspace user interface;

analyzing the first collateral item with a Generative Pre-trained Transformer (GPT) model to obtain a summary of the first collateral item; and causing the first client device to present the summary of the first collateral item on the second workspace user interface.

17. The data processing system of claim 16, wherein the machine-readable medium includes instructions configured to cause the processor to perform operations of:

identifying candidate collaborators to participate in the first workspace to collaborate on the first project based on a title associated with a first workspace, the keywords, or both; and presenting the candidate collaborators on the first user interface.

* * * * *